United States Patent
Chandramouli et al.

(10) Patent No.: US 10,536,917 B2
(45) Date of Patent: Jan. 14, 2020

(54) DUAL CONNECTIVITY FOR DIFFERENT ACCESS NETWORKS

(71) Applicant: NOKIA SOLUTIONS AND NETWORKS OY, Espoo (FI)

(72) Inventors: Devaki Chandramouli, Plano, TX (US); Subramanya Chandrashekar, Bangalore (IN); Hans Thomas Hoehne, Helsinki (FI); Cinzia Sartori, Pullach (DE); Woonhee Hwang, Espoo (FI); Amaanat Ali, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/548,463

(22) PCT Filed: Feb. 3, 2015

(86) PCT No.: PCT/US2015/014202
§ 371 (c)(1),
(2) Date: Aug. 3, 2017

(87) PCT Pub. No.: WO2016/126238
PCT Pub. Date: Aug. 11, 2016

(65) Prior Publication Data
US 2018/0020418 A1   Jan. 18, 2018

(51) Int. Cl.
*H04W 60/00*   (2009.01)
*H04W 8/06*   (2009.01)
(Continued)

(52) U.S. Cl.
CPC ......... *H04W 60/005* (2013.01); *H04W 16/14* (2013.01); *H04W 60/00* (2013.01);
(Continued)

(58) Field of Classification Search
CPC ... H04W 60/005; H04W 76/16; H04W 16/14; H04W 76/026; H04W 68/02
See application file for complete search history.

(56) References Cited

U.S. PATENT DOCUMENTS 8,195,190 B1 * 6/2012 Hou .................. G01S 5/0263
455/432.2
8,781,475 B1   7/2014 McKeeman
(Continued)

FOREIGN PATENT DOCUMENTS

WO   2014/129811 A1   8/2014

OTHER PUBLICATIONS

International Preliminary Report on Patentability and Written Opinion International Application No. PCT/US2015/014202 dated Aug. 8, 2017.
(Continued)

*Primary Examiner* — Ajit Patel
(74) *Attorney, Agent, or Firm* — Squire Patton Boggs (US) LLP

(57) ABSTRACT

There are provided measures for improvements in dual connectivity for different access networks. Such measures exemplarily comprise providing control in a control plane for a terminal (UE) for access to a first access network (5G), wherein a coverage of the first access network (5G) at least partly overlaps a coverage of a second access network (4G), the terminal is capable of having access to the first access network (5G) and to the second access network (4G) in parallel, and access for the terminal to a respective access network (4G, 5G) is routed in a user plane via a respective distinct access network entity (eNB, 5GAP) and to a respective (compatible) gateway (S-GW, uGW).

13 Claims, 23 Drawing Sheets

(51) Int. Cl.
*H04W 88/06* (2009.01)
*H04W 76/16* (2018.01)
*H04W 16/14* (2009.01)
*H04W 68/02* (2009.01)

(52) U.S. Cl.
CPC ........... *H04W 68/02* (2013.01); *H04W 76/16* (2018.02); *H04W 8/06* (2013.01); *H04W 88/06* (2013.01)

(56) References Cited

U.S. PATENT DOCUMENTS

| | | | | |
|---|---|---|---|---|
| 2008/0046580 | A1* | 2/2008 | Lafuente | H04M 3/42246 709/229 |
| 2010/0188975 | A1* | 7/2010 | Raleigh | G06Q 10/06375 370/230.1 |
| 2011/0319062 | A1 | 12/2011 | Markoulidakis | |
| 2012/0039167 | A1* | 2/2012 | Swaminathan | H04W 76/16 370/225 |
| 2012/0258707 | A1* | 10/2012 | Mathias | H04W 36/30 455/426.1 |
| 2013/0005240 | A1* | 1/2013 | Novak | H04W 72/085 455/11.1 |
| 2013/0044709 | A1* | 2/2013 | Adjakple | H04W 76/15 370/329 |
| 2013/0078995 | A1 | 3/2013 | Jouin | |
| 2013/0183975 | A1 | 7/2013 | Hyun | |
| 2013/0250783 | A1* | 9/2013 | Ericson | H04W 60/005 370/252 |
| 2013/0295948 | A1* | 11/2013 | Ye | H04W 72/0453 455/452.1 |
| 2013/0303203 | A1* | 11/2013 | Wang | H04W 68/00 455/458 |
| 2014/0241317 | A1 | 8/2014 | Jamadagni et al. | |
| 2014/0287753 | A1 | 9/2014 | Schulist et al. | |
| 2014/0341109 | A1* | 11/2014 | Cartmell | H04L 45/308 370/328 |
| 2015/0289270 | A1* | 10/2015 | Knapp | H04L 27/0006 455/452.1 |
| 2016/0057729 | A1* | 2/2016 | Horn | H04W 48/18 455/458 |
| 2016/0198400 | A1* | 7/2016 | Cho | H04W 8/08 370/328 |

OTHER PUBLICATIONS

International Search Report & Written Opinion dated Aug. 28, 2015 corresponding to International Patent Application No. PCT/US2015/014202.

3GPP TS 23.401 V13.0.0 (Sep. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Sep. 2014.

3GPP TS 23.272 V12.4.0 (Sep. 2014), Technical Specification, 3rd Generation Partnership Project; Technical Specification Group Services and System Aspects; Circuit Switched (CS) fallback in Evolved Packet System (EPS); Stage 2 (Release 12), Sep. 2014.

Extended European Search Report corresponding to Appln. No. 15881346.9, dated Jun. 1, 2018.

Dino Flore, "LTE RAN architecture aspects", IMT-Advanced Evaluation, Dec. 17-18, 2009, XP055476449.

Sumsung, "Introduction of Dual Connectivity", 3GPP TSG-RAN2 Meeting #88, San Francisco, USA, Nov. 17-21, 2014, R2-145301.

European Office Action corresponding to European Application No. 15 881 346.9, dated Sep. 13, 2019.

* cited by examiner

DUAL CONNECTIVITY FOR DIFFERENT ACCESS NETWORKS

FIELD

The present invention relates to improvements in dual connectivity for different access networks. More specifically, the present invention exemplarily relates to measures (including methods, apparatuses and computer program products) for realizing improvements in dual connectivity for different access networks.

BACKGROUND

Mobile data transmission and data services are constantly making progress. With the increasing penetration of such services, different access networks may coexist in parallel. Typically, in relation to mobile communication systems, an access network is represented by a radio access network (RAN) which is based on a certain radio access technology (RAT). While "radio" is a typical medium for mobile communication, other media are intended to be also covered by the principles taught herein. For example, Infrared or Bluetooth® or other media and/or wavelengths of radio are possible to represent the access network. As there has to be a (downward) compatibility between newly developed and pre-existing access networks and/or access networks technologies, terminals often have a capability to communicate based on one or more access networks technologies. Also, when a new access network is developed and launched, the network is not immediately available in the entire country of deployment, but its coverage may be limited to certain areas and be successively expanded over time.

The present invention will herein below be explained with reference to LTE as one example of a access network or radio access technology (LTE is also known as fourth generation 4G mobile communication) and its successor or improvement which is currently being developed and referred to as 5G (fifth generation mobile communication) as a further access network or radio access technology. In particular, 5G radio access technology will be referred to as a first access network, while LTE or 4G will be referred to as a second access network. Though, principles set out herein below are applicable to other scenarios of first and second access networks, too. Typically, a mobile communication network consists of an access network establishing the physical transport of data (payload (user) data and control data) and a core network establishing the control functionality for the entire network and the interoperability of the network with other networks, e.g. via gateways. References to specific network entities or nodes and their names are intended as mere example only. Other network node names may apply in different scenarios while still accomplishing the same functionality. Also, the same functionality may be moved to another network entity. Therefore, the principles as taught herein below are not to be understood as being limited to the specific scenario referred to for explanation purposes.

For example, the Evolved Packet System (EPS) is the successor of General Packet Radio System (GPRS). It provides a new radio interface and new packet core network functions for broadband wireless data access. Such EPS core network functions are the Mobility Management Entity (MME), Packet Data Network Gateway (PDN-GW, P-GW) and Serving Gateway (S-GW).

FIG. 1 illustrates the Evolved Packet Core architecture as introduced and defined by 3GPP TS 23.401 v13.0.0.

The entities involved and interfaces there between are defined in that document and reference is made thereto for further details. Acronyms used in the Figure are listed at the end of this specification.

A common packet domain Core Network is used for both Radio Access Networks (RAN), the Global System for Mobile Communication (GSM) Enhanced Radio Access Network (GERAN) and the Universal Terrestrial Radio Access Network (UTRAN). This common Core Network provides GPRS services.

E-UTRAN, the evolved UTRAN represents the nowadays known 4G network. Its successor referred to as 5G network is under development.

It is envisioned that such 5G system will provide new mobile low-latency and ultra-reliable services, and some services like Vehicle-To-X (V2X) will be more efficiently provided by 5G system.

A reference to 5G architecture that is envisioned is depicted in FIG. 2.

The entities involved and interfaces there between are for example known from such document. Acronyms used in the Figure are listed at the end of this specification.

In brief, a terminal such as a 5G NT (network terminal or user equipment) is provided with an internet protocol IP user network interface (IP UNI) and an Ethernet user network interface (ETH UNI) and may communicate via a Uu* interface with an Access Point (AP) in the mobile access network. The entire network has a mobile access part and a networks service part and an application part. Within each of those parts, there exists a control plane and a user (data) plane. The AP is located in both planes.

During the early days of 5G deployment, it is expected that 5G coverage area is not nationwide. It is therefore desirable that a solution is developed to allow 5G devices to camp in other radio access technologies (e.g. LTE) that are widely available so that a terminal or user equipment UE does not lose the connection to the network immediately after losing 5G coverage.

FIG. 3 shows such an example scenario in simplified manner. A terminal 1, such as a user equipment UE, e.g. exemplified by a so-called smartphone or another portable communication device, may move due to its mobility from a position A to a position B. In position A, it experiences the coverage of a LTE (4G) network as a first access network as well as of a 5G network as a second access network. The coverage of a respective network is graphically illustrated by a respective hatching. The 5G network is represented by an access point AP denoted by 2. The 4G network is represented in this example by 3 eNB's (or three 4G access points) denoted by 3a, 3b, 3c, respectively. The 4G network has a greater coverage as the 5G network. The coverage of both networks overlaps at least partly as illustrated and denoted by the arrow labeled "4+5G".

As shown, when moving from A to B, the terminal leaves the 4+5G coverage and enters the 4G only coverage. To the contrary, when moving from B to A, the terminal leaves the 4G only coverage and enters the 4+5G coverage.

Traditional inter RAT handover (HO) was designed for macro with bigger coverage area. Thus, frequent mobility with switching forth and back from one RAT to another RAT (ping-pong) was not expected. Traditional inter RAT HO starts from the premise that the border of each RAT is not widely spread over the coverage.

However, 5G cells are using high frequency spectrum (cmWave and mmWave), and thus the cell size will be small.

Also considering that 5G is a throughput booster, the 5G and other RAT border will be much wider and frequent RAT changes are expected.

A possible (conceptual) inter RAT architecture following traditional concepts is depicted in FIG. 4.

The entities involved and interfaces there between are for example known from such document. Acronyms used in the Figure are listed at the end of this specification.

In brief, a terminal such as a 5G/LTE UE (network terminal or user equipment) may communicate with respective access points of a LTE (4G) network and a 5G network. The user plane and control plane of the 4G network is structured in the known way, while the user plane and control plane of the 5G network is structured as envisioned. Several interfaces (G1, Sha*, G2, G3) are provided between several entities of the user plane and the control plane of both networks to coordinate the parallel connection of the terminal to both networks. The physical transport of data is however controlled and conducted by the respective network to which the data is sent by the terminal.

Such architecture has the benefits that a dedicated core for each access is provided, and that interworking can be enabled with little or no changes to legacy nodes.

Nevertheless, such architecture in addition shows the following drawbacks:
- architecture requires many new interfaces in order to support interworking thus increases complexity and latency of inter RAT HO,
- architecture creates excessive signaling; traditional (inter RAT) HO was designed for interworking between macro cells with bigger coverage area; with 5G small cells in the higher end of the spectrum (cmWave, mmWave), this paradigm might change: frequent RAT changes may happen (it depends on how dense 5G is) thus making this architecture not suitable/agile,
- statistics from field shows the issues with inter-RAT HO in general; besides that, inter RAT due to Circuit Switched Fallback (CSFB) also shows high increase of signaling, and
- service interruption introduced by the frequent RAT changes may impact 5G services negatively.

Furthermore, it is foreseen that Mobile Network Operators (MNO) may demand following characteristics:
- new system should abide by the rules of the legacy networks (i.e. should not require software upgrade of existing deployed network elements),
- existing Core Network (CN) elements can be upgraded to support both, 4G and 5G, at the same time, and
- operators will have the possibility to upgrade CN elements selectively e.g. some Mobility Management Entities (MME) are upgraded to become control plane Mobile Gateway (cMGW) that can serve both 4G and 5G.

Hence, in order to be able to fulfill varied requirements and at the same time to provide mobility robustness, the problem arises that a solution to improve dual connectivity ability was needed that does not significantly impact legacy networks and at the same time offers the required mobility robustness and enables fast switching.

Dual connectivity (DC) is defined in LTE with the primary objective to increase the throughput capacity per UE. The architecture of DC in LTE is as below.

FIGS. 5, 6 and 7 illustrate dual connectivity as defined in LTE.

In particular, FIG. 5 illustrates a control plane connectivity of evolved NodeBs (eNB) involved in dual connectivity, while FIGS. 6 and 7 illustrate user plane connectivity of eNBs involved in [LTE] dual connectivity (DC).

The entities involved and interfaces there between are defined in that document and reference is made thereto for further details. Acronyms used in the Figure are listed at the end of this specification.

In LTE DC, Radio Resource Control (RRC) signaling is provided only by Master eNB (MeNB) to UE, and MeNB is responsible to setup and to tear down DC, even though Secondary eNB (SeNB) can propose to tear down DC for local reason. Which bearer is to be served by SeNB is also decided by MeNB.

Combined attach procedure is supported for Packet Switched (PS) and Circuit Switched (CS) services (i.e. EPS attach and International Mobile Subscriber Identity (IMSI) attach; refer TS 23.272 version 12.4.0), however this is not supported for PS services from two different RATs.

Furthermore, currently for CS fallback to work, EPS services are suspended, and the UE falls back to 2G/3G RAT. Thus, the assumption is that there is only single connectivity and the combined registration procedure exists mainly for the CS core to obtain UE context and also to have the ability to reach the UE in case of Mobile Terminated (MT) calls.

Idle State Reduction (ISR) is a mechanism for a UE to be registered (attached) in two RATs at the same time when in idle mode but not in connected mode. The purpose is that a UE can recamp to different RATs without necessarily triggering a tracking area update (TAU).

Dual connectivity (DC) as defined in LTE can not solve the above problems and satisfy the mentioned requirements.

Hence, there is a need to provide for improvements in dual connectivity for different access networks.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a device, comprising a processor configured to provide control in a control plane for a terminal for access to a first access network, wherein a coverage of the first access network at least partly overlaps a coverage of a second access network, the terminal is capable of having access to the first access network and to the second access network in parallel, and access for the terminal to a respective access network is routed in a user plane via a respective distinct access network entity and to a respective compatible gateway, wherein the processor is configured to receive, via an interface, from a packet core network entity providing control in said control plane for said terminal for access to said second access network, a message indicative of said terminal to be registered, and register said terminal as being capable of having access to the first access network.

According to an exemplary aspect of the present invention, there is provided a device, comprising a processor configured to provide control in a control plane for a terminal for access to a first access network and to a second access network, wherein a coverage of the first access network at least partly overlaps a coverage of the second access network, the terminal is capable of having access to the first access network and to the second access network in parallel, and access for the terminal to a respective access network is routed in a user plane via a respective distinct access network entity and to a respective compatible gateway, wherein the processor is configured to conduct, with the terminal, a connection procedure for access to said second access network, and register said terminal as being capable of having access to the first access network and to the second access network.

According to an exemplary aspect of the present invention, there is provided a device, comprising a processor configured to provide control in a control plane for a terminal for access to a first access network and to a second access network, wherein a coverage of the first access network at least partly overlaps a coverage of the second access network, the terminal is capable of having access to the first access network and to the second access network in parallel, access for the terminal to a respective access network is routed in a user plane via a respective distinct access network entity and to a respective compatible gateway, and said control in said control plane is provided via a network controller entity adopting connection management for said access network entity of the second access network, wherein the processor is configured to conduct, with the terminal, a connection procedure for access to said second access network, and register said terminal as being capable of having access to the first access network and to the second access network.

According to an exemplary aspect of the present invention, there is provided a device, comprising a processor configured to provide, in a control plane for a terminal capable of having access to a first access network and to a second access network in parallel, connection management for an access network entity of said second access network, wherein a coverage of the first access network at least partly overlaps a coverage of the second access network, access for the terminal to a respective access network is routed in a user plane via a respective distinct access network entity and to a respective compatible gateway, and control in said control plane for said terminal for access to said first access network and to said second access network is provided by a packet core network entity, wherein the processor is configured to receive, in the control plane, messages related to a connection procedure with said terminal for access to said second access network, and forward, in the control plane, said messages related to said connection procedure with said terminal for access to said second access network.

According to an exemplary aspect of the present invention, there is provided a method, comprising providing control in a control plane for a terminal for access to a first access network, wherein a coverage of the first access network at least partly overlaps a coverage of a second access network, the terminal is capable of having access to the first access network and to the second access network in parallel, and access for the terminal to a respective access network is routed in a user plane via a respective distinct access network entity and to a respective compatible gateway, the method further comprising receiving, via an interface, from a packet core network entity providing control in said control plane for said terminal for access to said second access network, a message indicative of said terminal to be registered, and registering said terminal as being capable of having access to the first access network.

According to an exemplary aspect of the present invention, there is provided a method, comprising providing control in a control plane for a terminal for access to a first access network and to a second access network, wherein a coverage of the first access network at least partly overlaps a coverage of the second access network, the terminal is capable of having access to the first access network and to the second access network in parallel, and access for the terminal to a respective access network is routed in a user plane via a respective distinct access network entity and to a respective compatible gateway, the method further comprising conducting, with the terminal, a connection procedure for access to said second access network, and registering said terminal as being capable of having access to the first access network and to the second access network.

According to an exemplary aspect of the present invention, there is provided a method, comprising providing control in a control plane for a terminal for access to a first access network and to a second access network, wherein a coverage of the first access network at least partly overlaps a coverage of the second access network, the terminal is capable of having access to the first access network and to the second access network in parallel, access for the terminal to a respective access network is routed in a user plane via a respective distinct access network entity and to a respective compatible gateway, and said control in said control plane is provided via a network controller entity adopting connection management for said access network entity of the second access network, the method further comprising conducting, with the terminal, a connection procedure for access to said second access network, and registering said terminal as being capable of having access to the first access network and to the second access network.

According to an exemplary aspect of the present invention, there is provided a method, comprising providing, in a control plane for a terminal capable of having access to a first access network and to a second access network in parallel, connection management for an access network entity of said second access network, wherein a coverage of the first access network at least partly overlaps a coverage of the second access network, access for the terminal to a respective access network is routed in a user plane via a respective distinct access network entity and to a respective compatible gateway, and control in said control plane for said terminal for access to said first access network and to said second access network is provided by a packet core network entity, the method further comprising receiving, in the control plane, messages related to a connection procedure with said terminal for access to said second access network, and forwarding, in the control plane, said messages related to said connection procedure with said terminal for access to said second access network.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient avoidance of a complete radio link failure (both involved access networks) and improves robustness of network connectivity to thereby solve at least part of the problems and drawbacks identified in relation to the prior art.

By way of exemplary embodiments of the present invention, there is provided improvements in dual connectivity for different access networks. More specifically, by way of exemplary embodiments of the present invention, there are provided measures and mechanisms for realizing improvements in dual connectivity for different access networks.

Thus, improvement is achieved by methods, apparatuses and computer program products enabling/realizing improvements in dual connectivity for different access networks.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
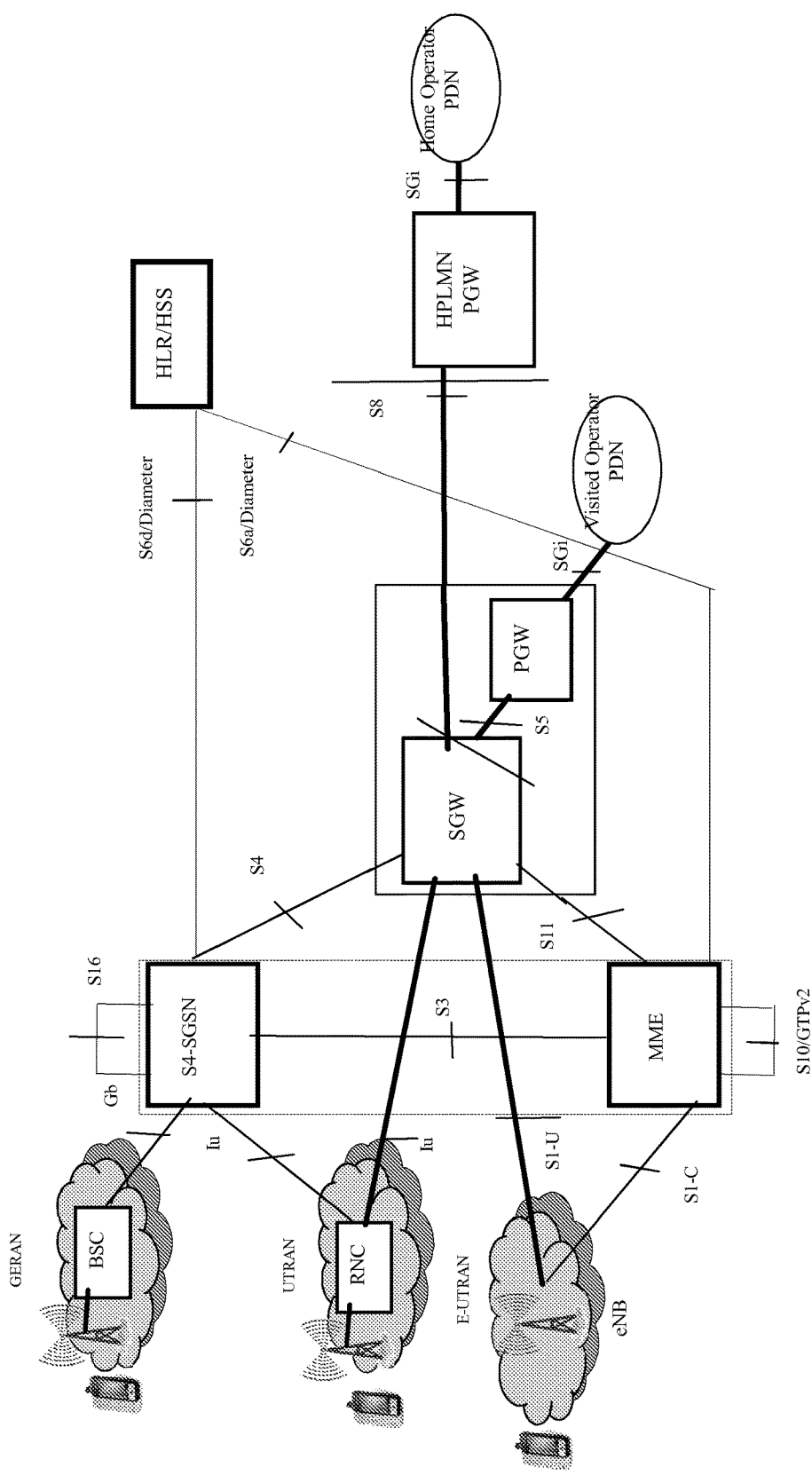
FIG. 1 illustrates a commonly known architecture of the EPS.
Figure 2:
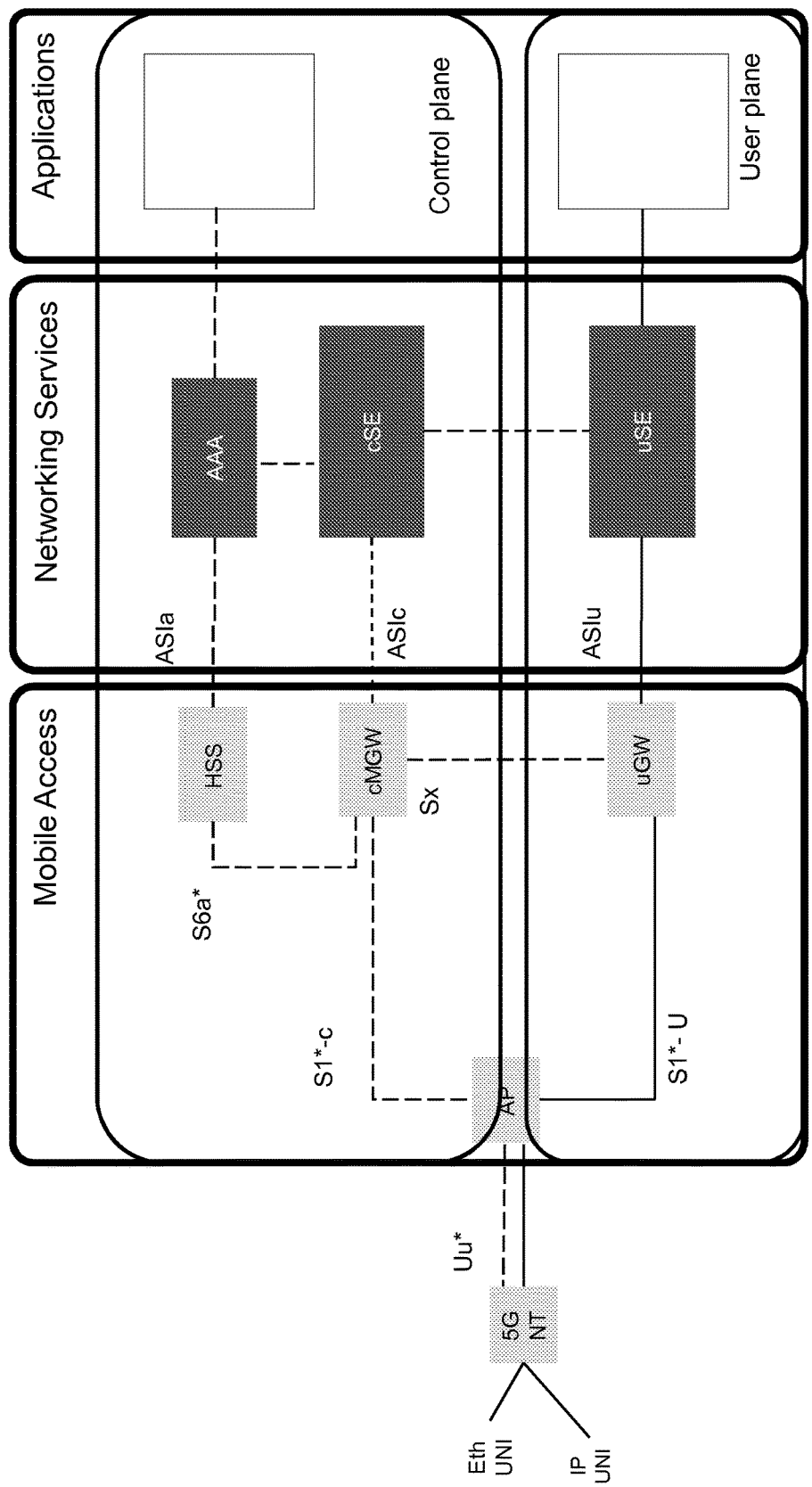
FIG. 2 illustrates a reference architecture of a 5G network.
Figure 3:
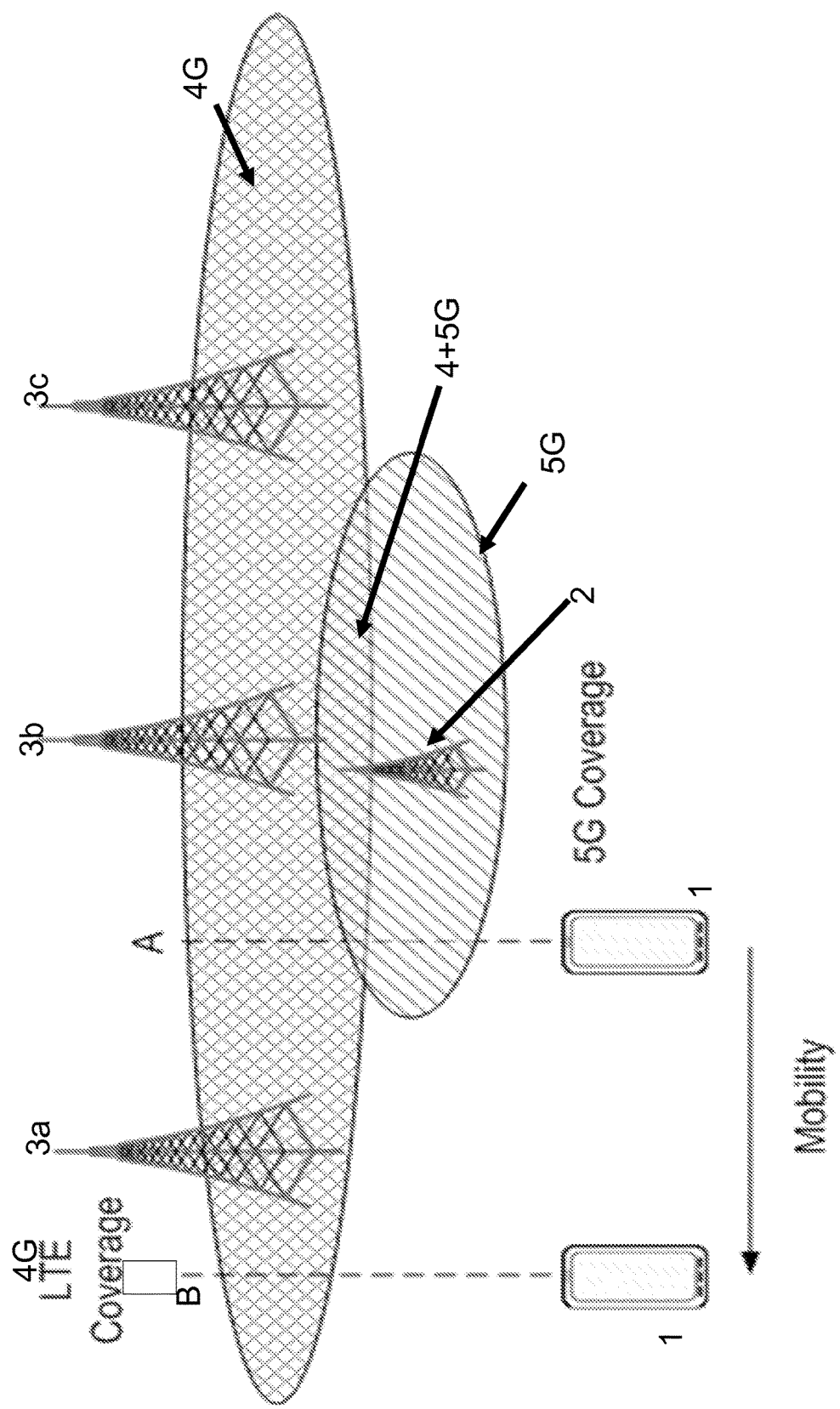
FIG. 3 illustrates an iRAT HO scenario to which the present invention can be advantageously applied.
Figure 4:
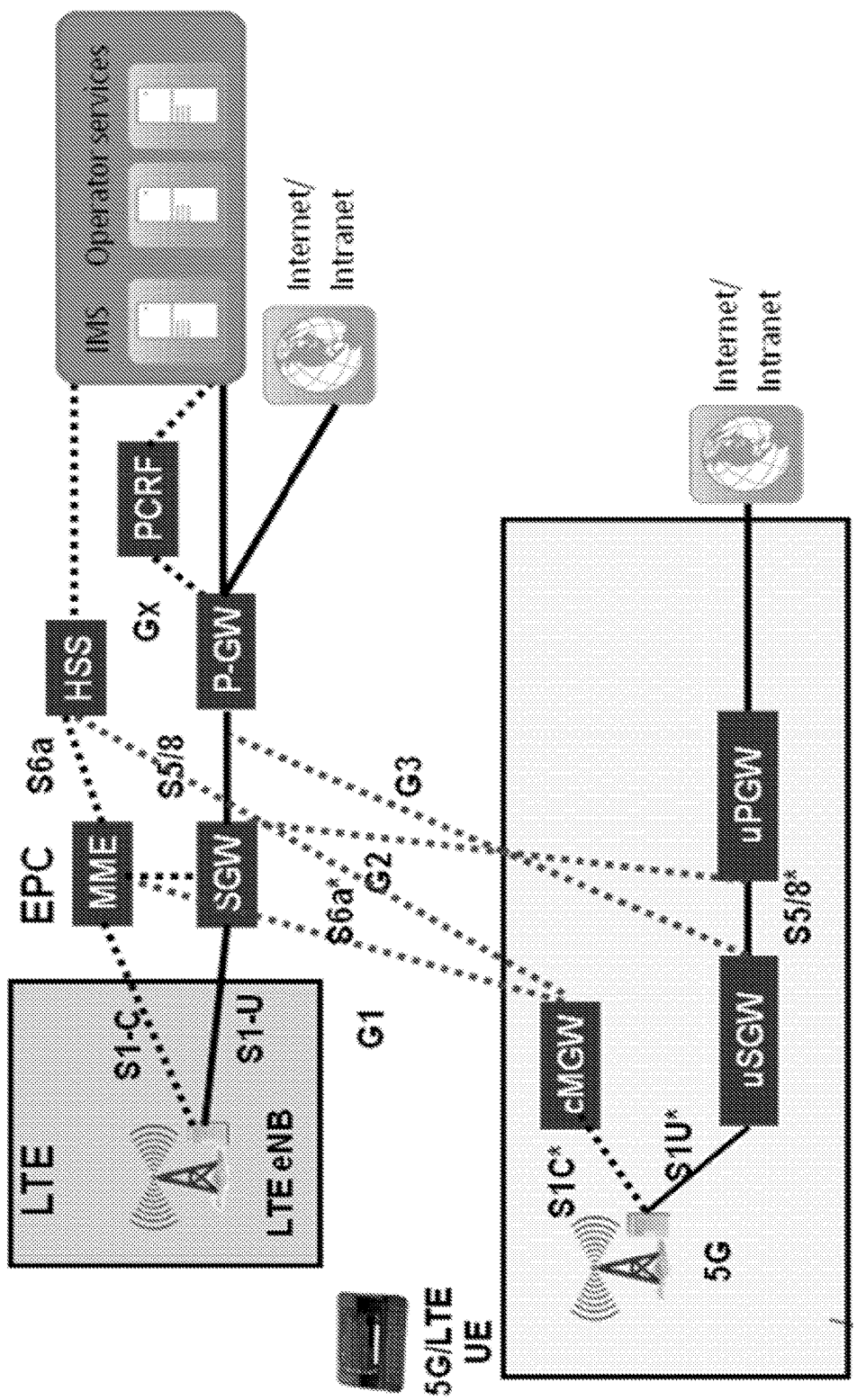
FIG. 4 illustrates possible inter RAT architecture following traditional concepts.
Figure 5:
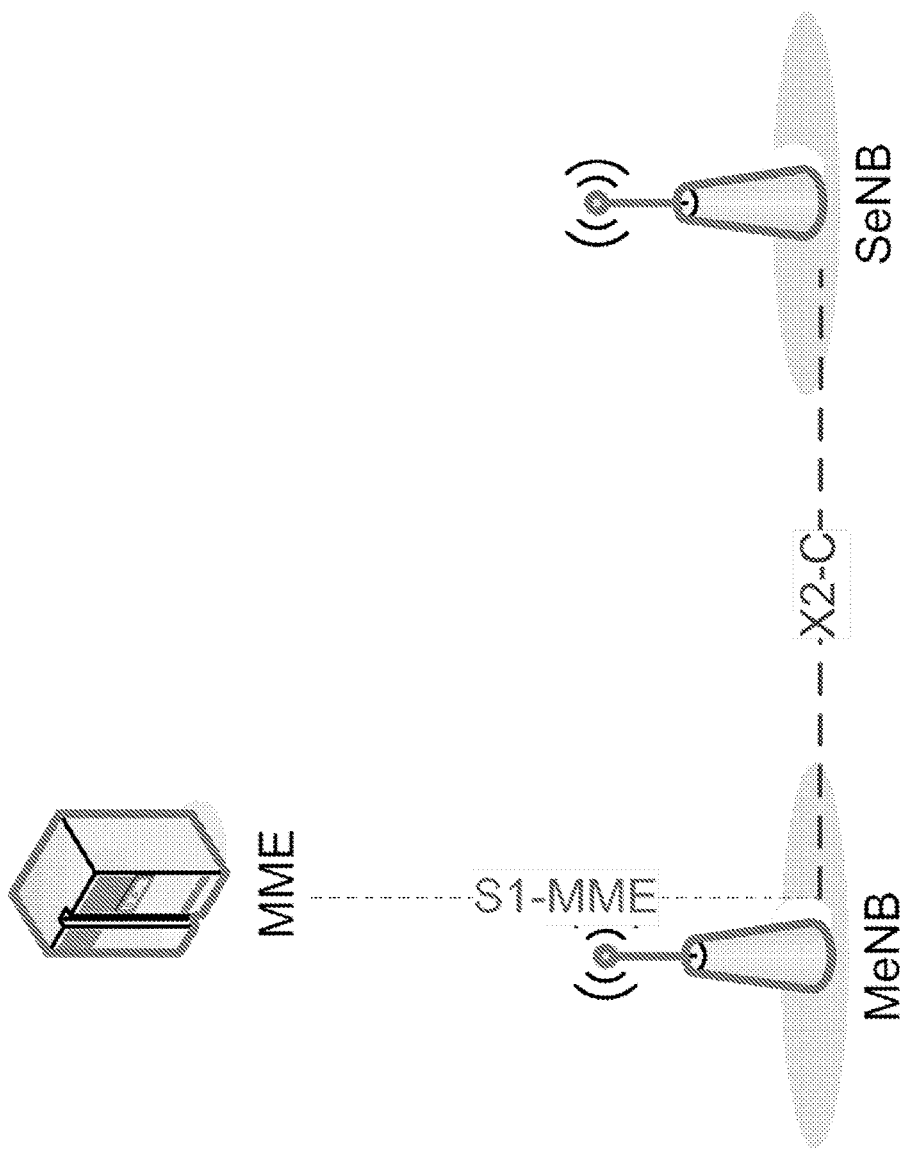
FIG. 5 illustrates a control plane connectivity of evolved NodeBs (eNB) involved in dual connectivity as defined in LTE.
Figure 6:
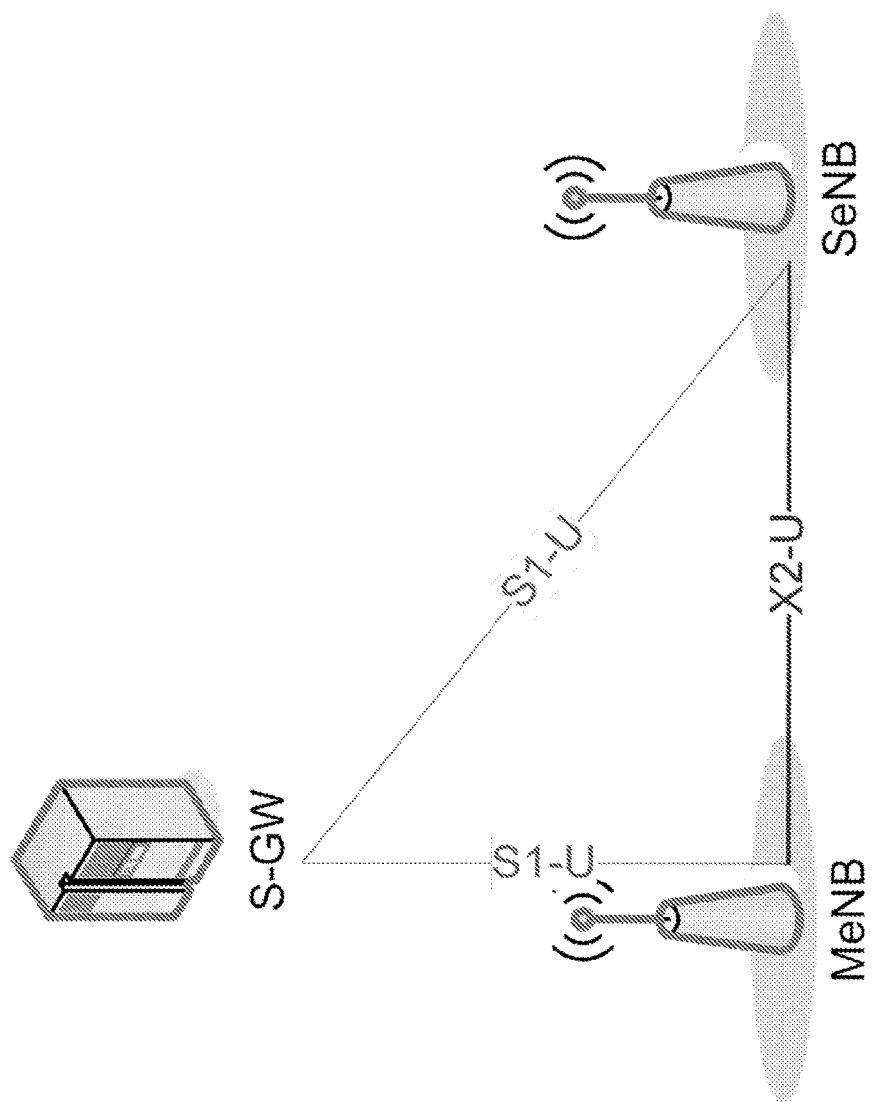
FIG. 6 illustrates user plane connectivity of eNBs involved in dual connectivity as defined in LTE.
Figure 7:
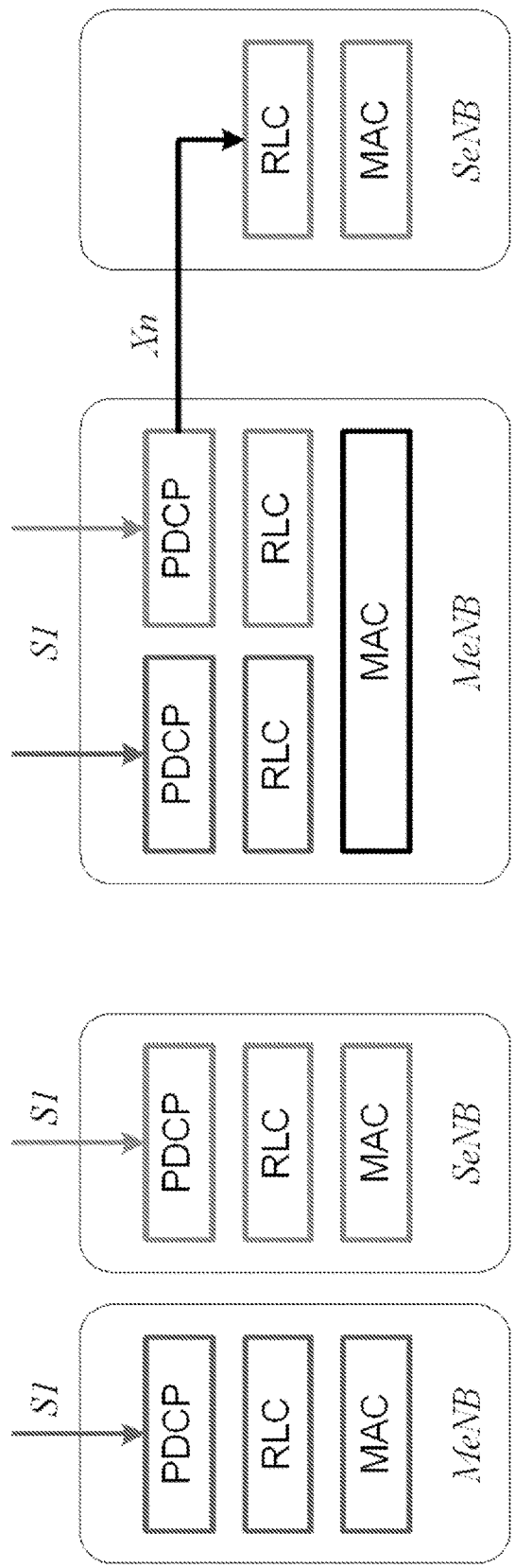
FIG. 7 illustrates user plane connectivity of eNBs involved in dual connectivity as defined in LTE.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) improvements in dual connectivity for different access networks.

According to exemplary embodiments of the present invention, an interworking architecture is introduced that allows dual connectivity for control plane signaling between LTE and 5G, and at the same time allows interworking without significant impact to legacy networks. Dual connectivity in the context implies that UE has RRC connections simultaneously in 4G and 5G.

Following triggers for dual connectivity are considered:
  new RAT specific service setup is the first trigger for establishing dual connectivity: e.g. when UE enters 5G area from LTE area (where LTE is still offered), it does not relinquish LTE connection, establishes connectivity for 5G; later, even if the UE loses 5G coverage, it retains the radio connection with LTE; thus, the UE services are not abruptly terminated; in other words, a service (such as Vehicle-to-Vehicle (V2V)) may be available only on one RAT (e.g. 5G), and establishing the service would trigger establishing dual connectivity (4G-5G), there may be other triggers for dual connectivity as well (e.g. based on operator policies, traffic offloading, overload control etc) but DC based on service setup cannot be ruled out.

Figure 8:
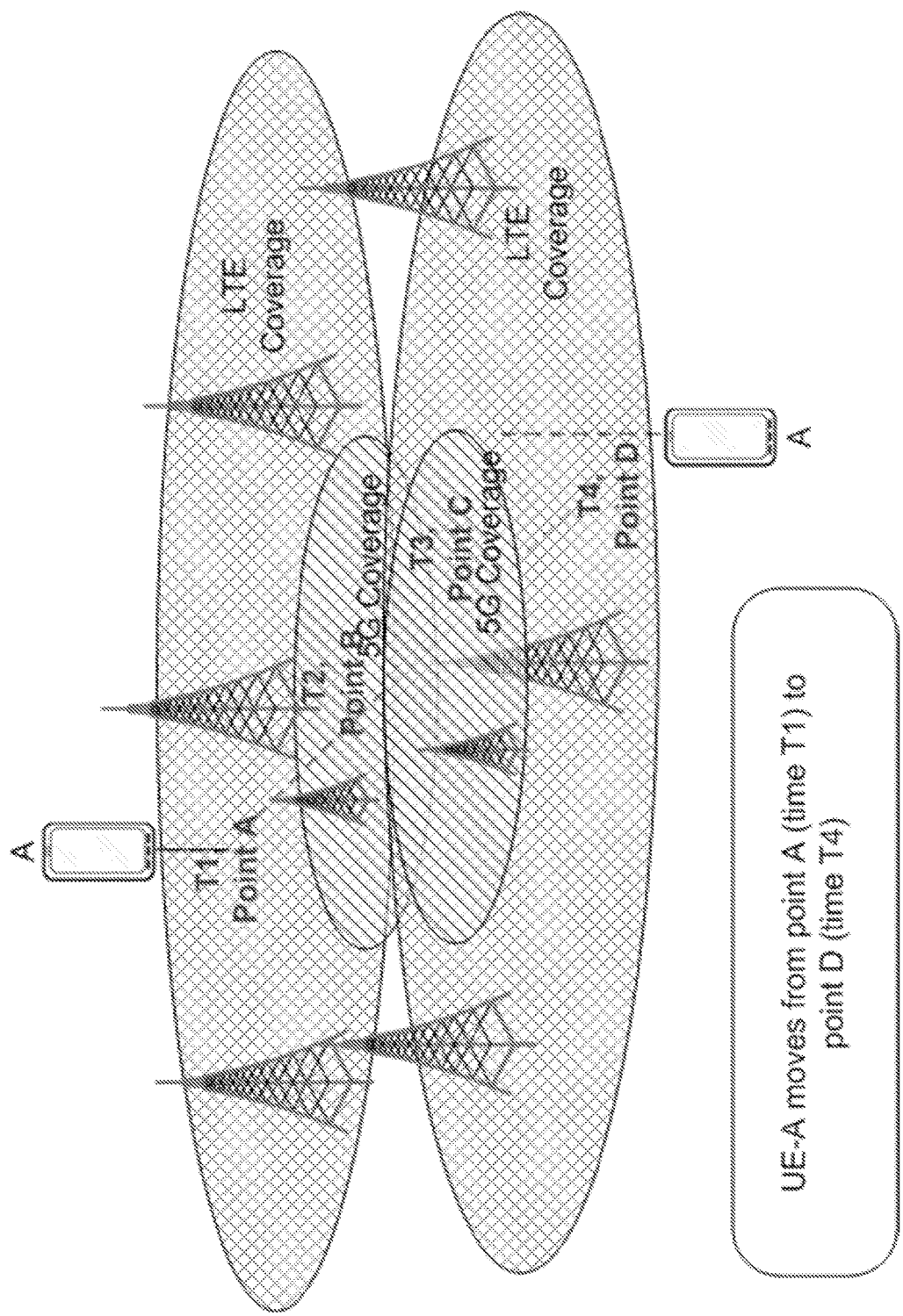
FIG. 8 illustrates an iRAT HO scenario which is a modification of the general iRAT HO scenario illustrated in FIG. 3, to which the present invention can be advantageously applied.

Generally, the invention is implemented in a scenario as illustrated in FIG. 8 in terms of inter RAT processing.

In this scenario, it is subsequently assumed that the terminal UE is 4G and 5G capable, i.e. the terminal (UE) is capable to have access to a first access network (5G) and to a second access network (4G). The terminal UE may have a RRC connection (i.e. in the control plane) in the first access network, 5G, and in the second access network, 4G, simultaneously and/or in parallel. Also, as shown in FIG. 8, the coverage of the first access network (5G) at least partly overlaps the coverage of the second access network (4G), and the terminal is capable of having access to the first access network and to the second access network in parallel. Access for the terminal to a respective access network (4G, 5G) is routed in a user plane via a respective distinct access network entity (eNB, 5GAP).

Figure 9:
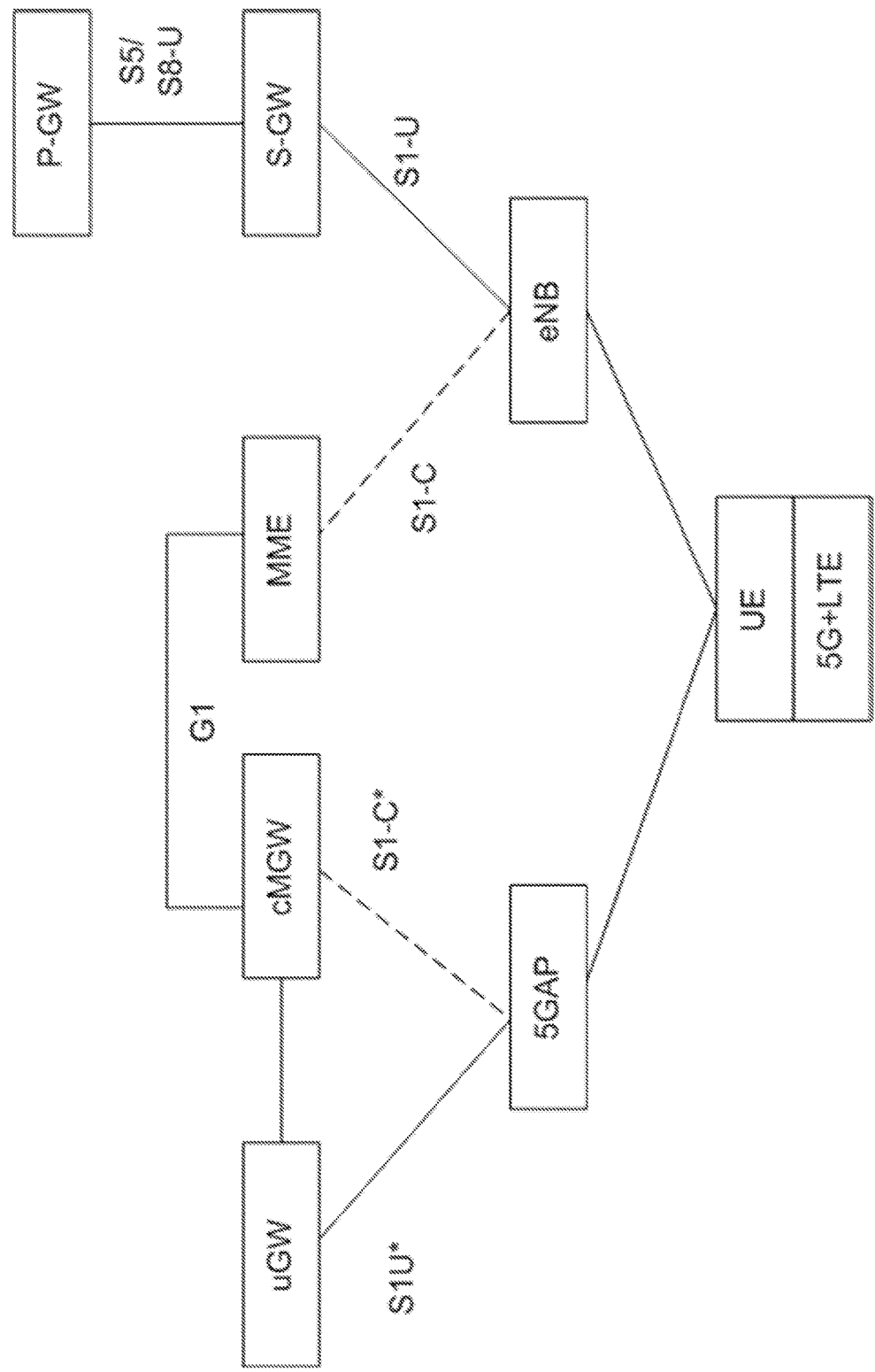
FIG. 9 shows a schematic diagram of an example of a system environment with interfacing/signaling variants according to exemplary embodiments of the present invention.
Figure 10:
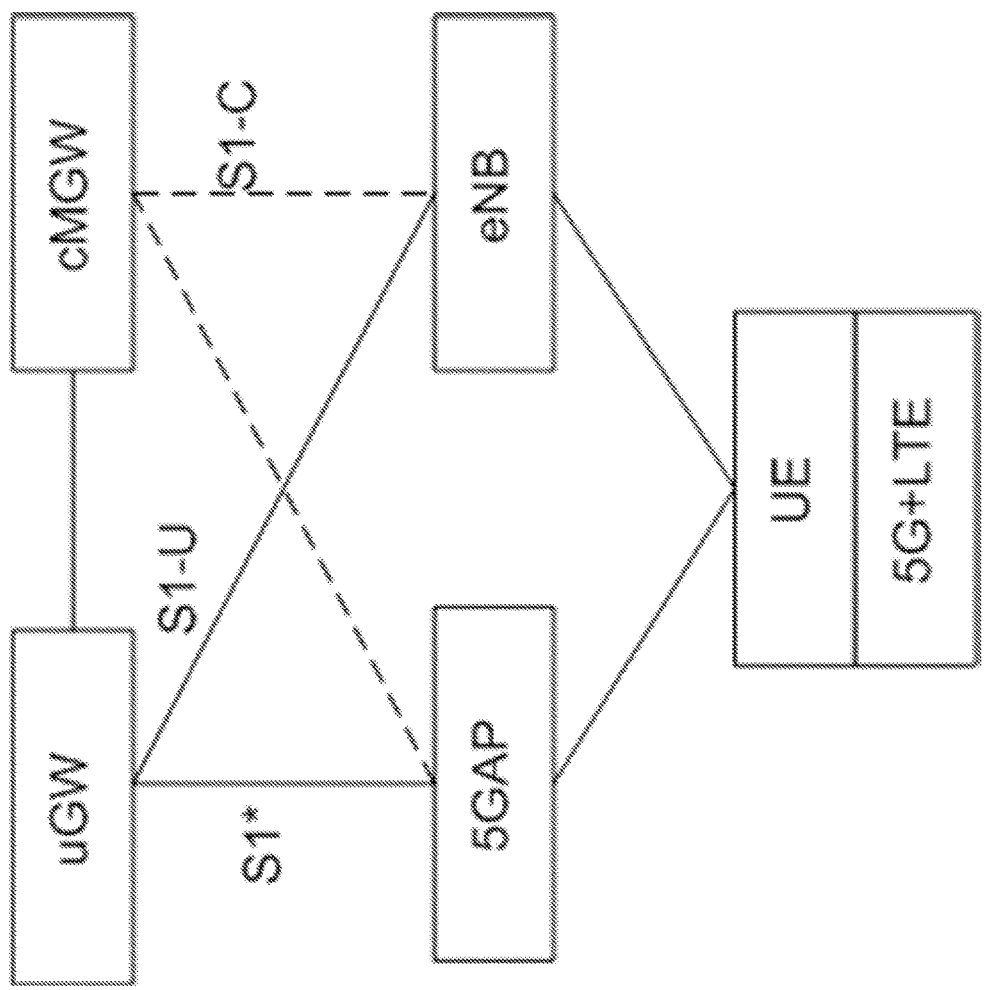
FIG. 10 shows a schematic diagram of an example of a system environment with interfacing/signaling variants according to exemplary embodiments of the present invention.
Figure 11:
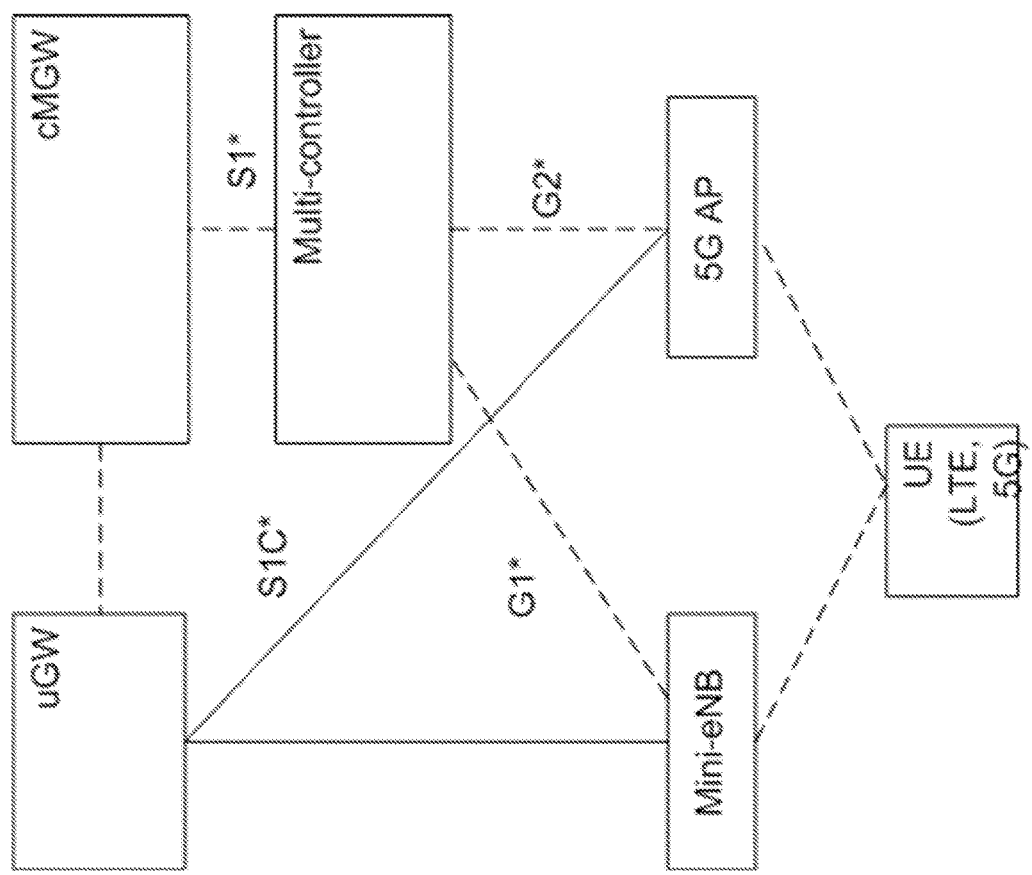
FIG. 11 shows a schematic diagram of an example of a system environment with interfacing/signaling variants according to exemplary embodiments of the present invention.

Details of exemplary embodiments are exemplified in the system environments with interfacing/signaling variants illustrated in FIGS. 9 to 11 and in the signaling diagrams illustrated in FIGS. 12 to 18. For FIGS. 9 to 11, it is noted that entities involved are illustrated in boxes with the respective interfaces shown as lines there between. For FIGS. 12 to 18, it is noted that entities involved are illustrated in the horizontal arrangement as well as the signaling messages exchanged there between. Actions performed by individual entities are illustrated in the respective boxes, wherein the vertical arrangement of the boxes and signaling messages basically represents the timing thereof in relation to the other actions/signaling.

According to a first example embodiment of the present invention, an interworking architecture with a dedicated core (dual connectivity option) is provided.

According to a second example embodiment of the present invention, an interworking architecture with common core (dual connectivity option—common NAS context) is provided.

According to a third example embodiment of the present invention, an interworking architecture with common core and multi-controller (dual connectivity option—common AS context, common NAS context) is provided.

In this regard, common Access Stratum (AS) context means that one functional element stores and manages UE AS context for 4G and 5G radio access technologies. Further, common Non-Access Stratum (NAS) context means that one functional element stores and manages UE NAS context for 4G and 5G domains. The common NAS context storage could be an integrated context storage where the context elements are stored in one data structure and are same for both 4G and 5G, but it could be also a separate 4G context and a separate 5G context data structure, held in one place thereby effectively forming a 4G-5G common data structure.

The NAS context may indicate the RRC states of each radio access domain.

Figure 12:
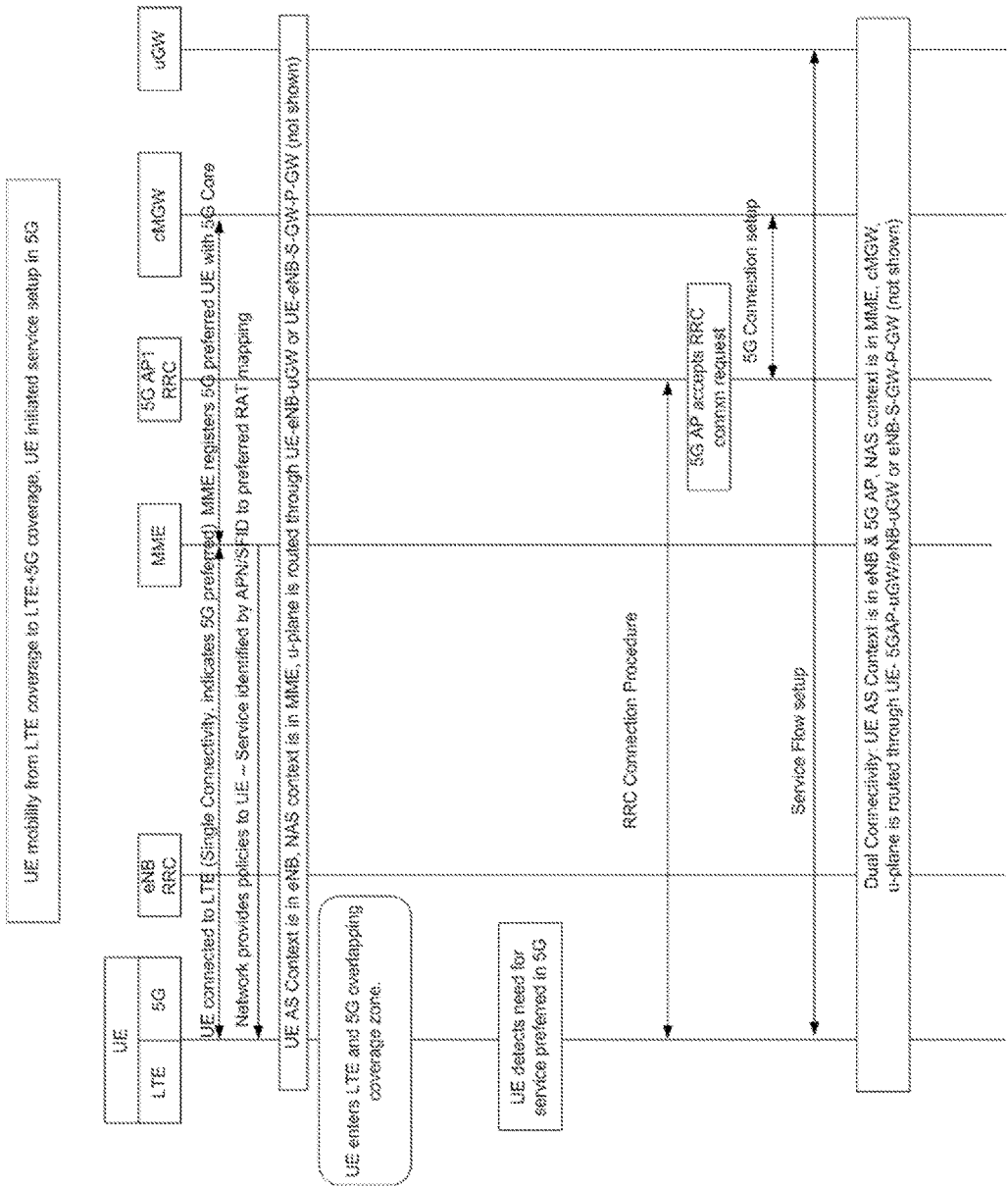
FIG. 12 shows a schematic diagram of signaling sequences according to exemplary embodiments of the present invention.
Figure 13:
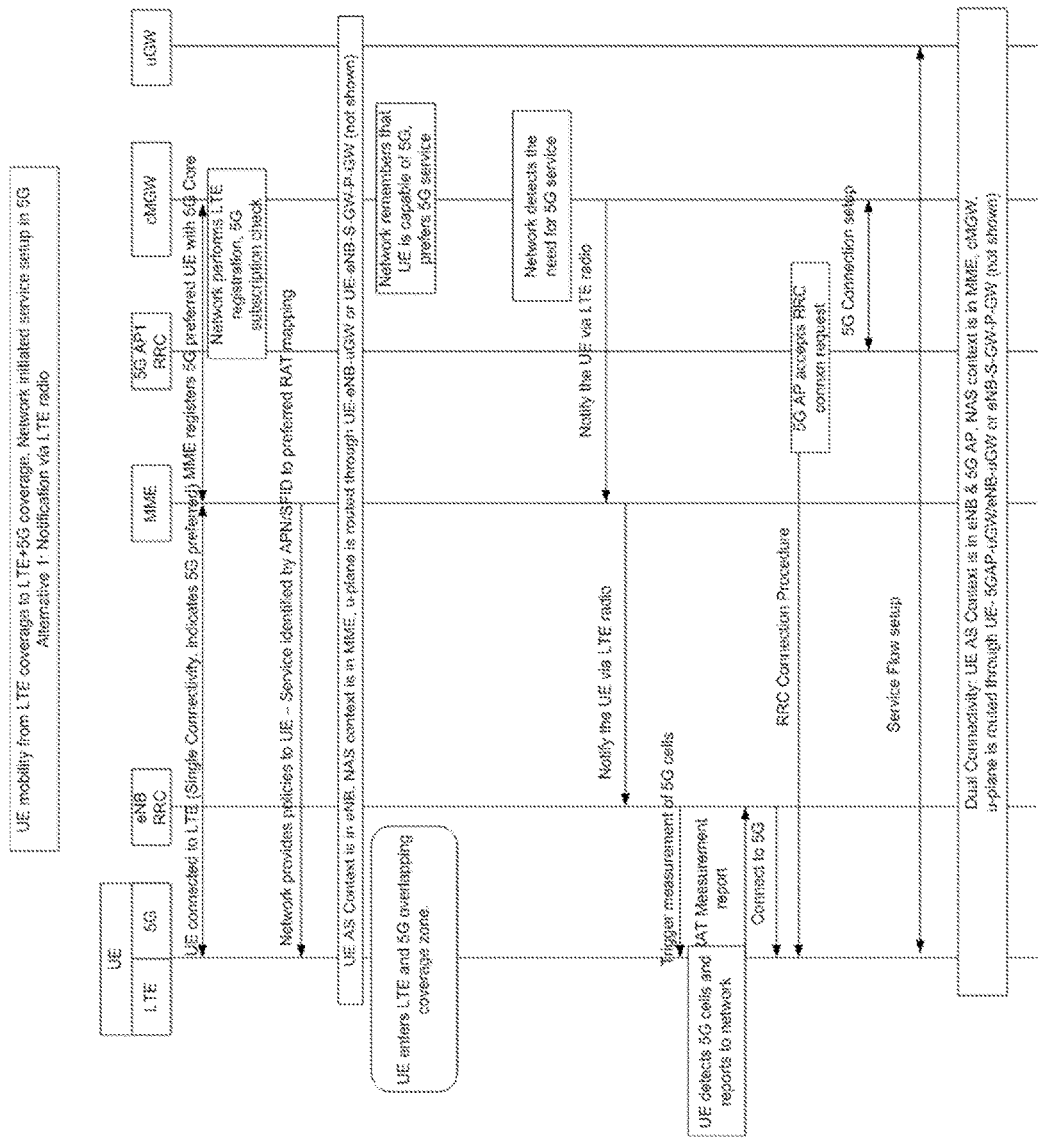
FIG. 13 shows a schematic diagram of signaling sequences according to exemplary embodiments of the present invention.

First Example Embodiment (FIGS. 9, 12, 13)

Figure 19:
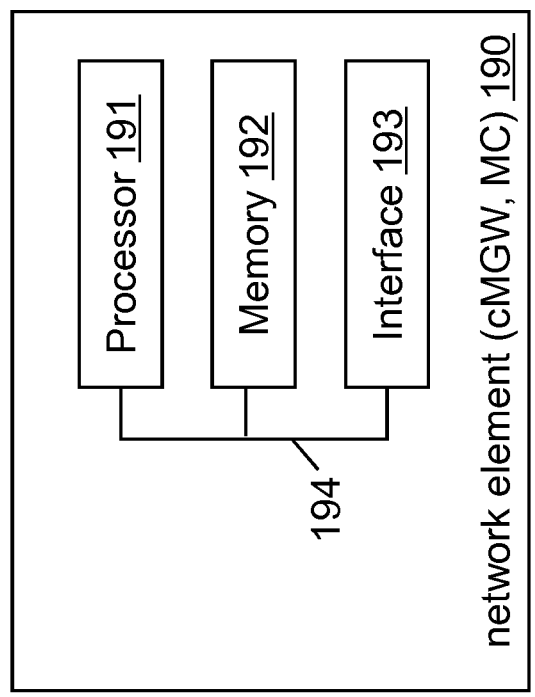
FIG. 19 is a block diagram illustrating apparatuses according to exemplary embodiments of the present invention.

In the above scenario, for example, as shown in FIG. 19, according to at least some aspects of the invention, there is proposed a device (cMGW) comprising a processor (at least one processor) 191, a memory 192, and an interface (at least one interface) 193, the processor 191 being configured to provide control in a control plane for a terminal (UE) for access to a first access network (5G), wherein a coverage of the first access network (5G) at least partly overlaps a coverage of a second access network (4G), the terminal is capable of having access to the first access network (5G) and to the second access network (4G) in parallel, and access for the terminal to a respective access network (4G, 5G) is routed in a user plane via a respective distinct access network entity (eNB, 5GAP) and to a respective (compatible) gateway (S-GW, uGW), wherein the processor is further configured to receive, via an interface (G1), from a packet core network entity (MME) providing control in said control plane for said terminal (UE) for access to said second access network (4G), a message indicative of said terminal (UE) to be registered, and register said terminal as being capable of having access to the first access network (5G).

According to individual further aspects, the processor is configured to manage non access stratum context for said first access network (5G) with non access stratum context for said second access network (4G) being managed by said packet core network entity (MME), the processor is configured to, responsive to registering said terminal as being capable of having access to the first access network (5G), initiate the modification of the routing in the user plane via the second access network (4G) such that the user plane is routed via the access network entity (eNB) of the second access network (4G) to the gateway (uGW) of the first access network (5G), the processor is configured to receive, from the access network entity (5GAP) of the first access network (5G), signaling indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G, the processor is configured to detect a need for access of said terminal (UE) to said first access network (5G), instruct the packet core network entity (MME) of said second access network (4G) to cause initiation of a connection setup procedure between said terminal and said first access network (5G), receive, from the access network entity (5GAP) of the first access network (5G), signaling indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G), the processor is configured to detect a need for access of said terminal (UE) to said first access network (5G), instruct the access network entity (5GAP) of the first access network (5G) to initiate a paging procedure with said terminal (UE), receive, from the access network entity (5GAP) of the first access network (5G), a paging response indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G).

Figure 20:
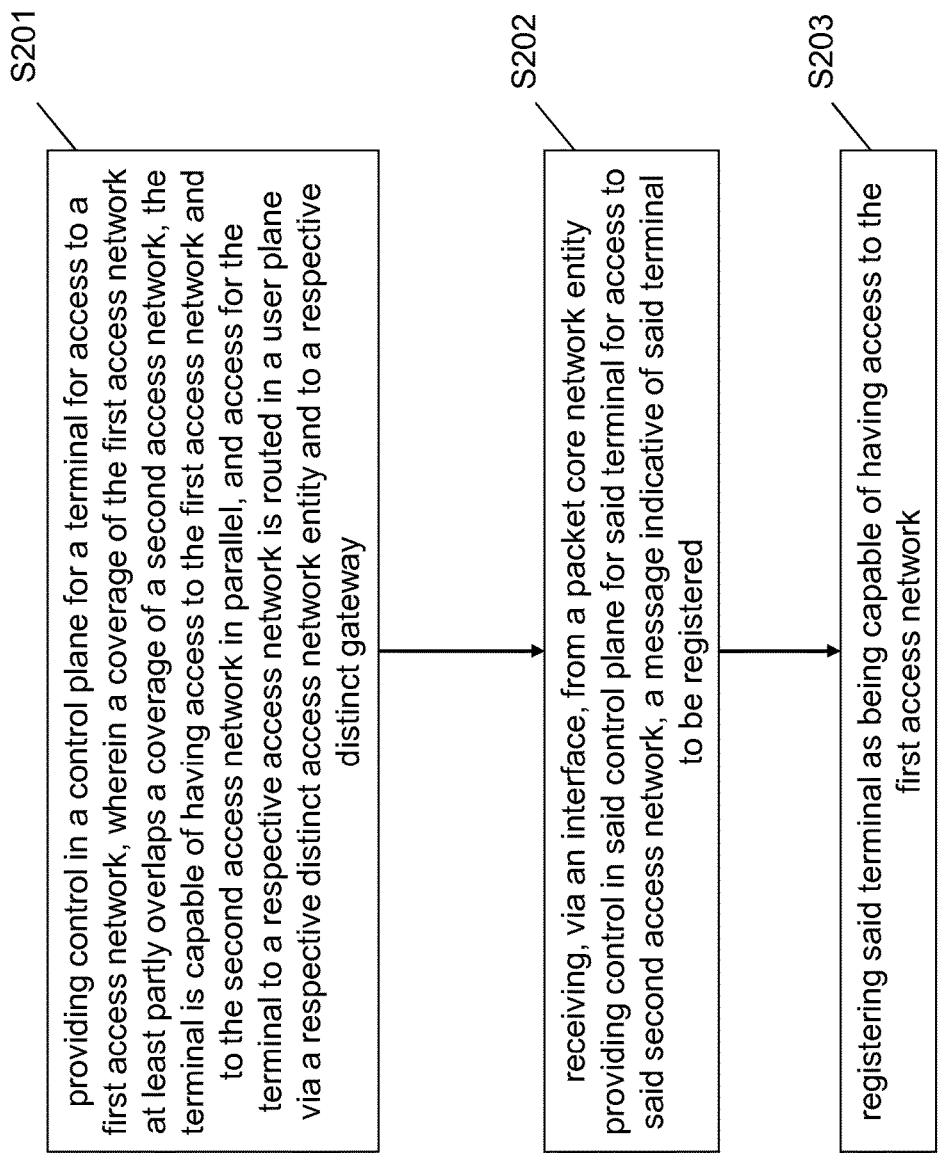
FIG. 20 is a schematic diagram of a procedure according to exemplary embodiments of the present invention.

In addition, as shown in FIG. 20, according to at least some aspects of the invention, there is proposed a method comprising an operation of providing (S201) control in a control plane for a terminal (UE) for access to a first access network (5G), wherein a coverage of the first access network (5G) at least partly overlaps a coverage of a second access network (4G), the terminal is capable of having access to the first access network (5G) and to the second access network (4G) in parallel, and access for the terminal to a respective access network (4G, 5G) is routed in a user plane via a respective distinct access network entity (eNB, 5GAP) and to a respective (compatible) gateway (S-GW, uGW), an operation of receiving (S202), via an interface (G1), from a packet core network entity (MME) providing control in said control plane for said terminal (UE) for access to said second access network (4G), a message indicative of said terminal (UE) to be registered, and an operation of registering (S203) said terminal as being capable of having access to the first access network (5G).

In other words, dual connectivity and combined attach procedure across two RATs (4G and 5G) for Internet Protocol (IP) or Ethernet services is enabled by means of introducing a new interface (G1) between two packet core network elements (i.e. MME and cMGW).

FIG. 9 illustrates the high level (interworking) architecture according to some aspects of the invention that assumes dedicated core network for different access technologies but at the same time allows dual connectivity to help improve mobility robustness.

Here, UE supports LTE and 5G, where
  5G and LTE have their own RRC connections (two independent control plane stacks),
  5G and LTE capable UE indicates its preference for 5G services while registering in LTE network, and
  5G and LTE capable UE can perform measurements periodically for 5G access, based on indication from network or when it detects the need for 5G services, when under coverage area for both LTE and 5G.
In relation to the dedicated core networks for LTE and 5G,
  MME maintains NAS context for LTE,
  cMGW maintains NAS context for 5G,
  User plane for 5G and LTE can go via user plane Gateway (uGW),
  user plane for LTE can also go via S-GW, P-GW, and
  new interface (G1) is created between two packet core nodes to enable dual connectivity and combined registration.

Options are illustrated with the help of following scenarios in the overall scenario illustrated in FIG. 8:
  1. UE initiated service setup triggering IRAT dual connectivity; and
  2. Network initiated service setup triggering IRAT dual connectivity.
For this purpose, following assumptions are made with respect to FIG. 8:
  UE with LTE connection moves to dual coverage zone i.e. 5G+4G coverage area (from point A to point B); UE detects 5G e.g. because measurements were activated, e.g. measurements can be activated by the 5G-UE when entering the 5G area, as LTE sysinfos indicates 5G neighbors,
    sysinfo indication could be service specific, as can be the measurement activation,
  UE is registered for LTE with the MME; MME selects the cMGW based on selection algorithm (e.g. IMSI hashing algorithm, operator policies etc) and registers 5G services preferred UE with 5G core network (cMGW); UE is in EMM-REGISTERED state in the LTE network and in a similar state in 5G network,
  UE receives policy information from the network (MME) regarding the preferred RAT information for different services,
    this could be a mapping between APN/SFID (Service Flow ID) and preferred RAT; this may indicate that LTE/2G/3G is preferred for voice, 5G/LTE is preferred for internet services, 5G is preferred for V2V services etc.,
    operator policy information can also be pre-configured, or broadcast in sysinfo,
  network or UE can trigger setup of dual connectivity when need for a service configured to be served by 5G,
  this enables establishment of RRC connection in 5G (RRC in LTE is established already).

1. UE initiated service setup triggering IRAT dual connectivity (FIG. 12):
Here, as shown in FIG. 12, a UE initiated service setup triggers IRAT dual connectivity:
  UE is in the coverage area for both 5G and 4G,
  UE may detect that V2V services are offered by the network in the area or the user may initiate a new application that requires setup of V2V services,
  when UE determines that V2V services are needed, it knows that 5G is preferred for V2V and it also knows that it is already in the area where 5G coverage is available (i.e. based on measurement report), and
  UE initiates requests for service setup which triggers setup of RRC connection in 5G.

2. Network initiated service setup triggering IRAT dual connectivity (FIG. 13):
Here, as shown in FIG. 13, network initiated service setup triggers IRAT dual connectivity:
  network remembers that the UE is interested in 5G services; when network detects the need for a new service (mobile terminated) that can be served in 5G optimally, network can trigger the UE to establish services in 5G using one of the following two methods:
    1. network notifies (FIG. 13) the UE via E-UTRAN radio network (assumption: eNB is upgraded), and
    2. Network pages the UE via 5G radio (assumption: UE is connected in E-UTRAN but listens to paging channel also in 5G);
  in case of (1), eNB triggers the UE to perform 5G measurement and based on measurement report, eNB can determine whether it is in the 5G coverage area or not; if the UE is in 5G coverage area, eNB can request the UE to establish RRC connection in 5G in order to setup a new service;
  in case of (2), UE is expected to respond to paging via 5G radio (i.e. establish RRC connection) towards the network; network can then initiate establishment of new service in the 5G radio network.

Option (1) is more optimal compared to option (2) as option (2) requires that UE needs to listen to paging in 5G radio while connected in LTE.

Measures according to the first example embodiment do have the following benefits:
  interworking can be enabled with minimal changes to legacy nodes, incumbent MNOs can deploy 5G as an overlay network without requiring upgrade of radio access and packet core network, when dual RRC connection is established, chance of complete radio link failure is low, and robustness of network connectivity, since UE is connected to LTE macro even when there is handover for 5G radio due to mobility.

According to exemplary aspects of the first example embodiment of the invention, following modifications are proposed:

Combined registration with both 4G and 5G (RAT or domain) in connected mode: the registration may happen separately, simultaneously or sequentially on a need basis, One authentication procedure for both RATs or domains: the authentication procedure happens in tandem with registration; authentication details may be same or different in 4G and 5G; one authentication for both domains will happen latest with the setup of DC, and earliest with a DC enabled UE seeking initial attach to one RAT, new interface between MME and cMGW (G1) in order to enable combined attach for offering PS services simultaneously in both 4G and 5G, new interface used also to complete UE initiated dual connectivity setup in 4G and 5G, and new interface used also to initiate paging for other RAT in order to perform network initiated dual connectivity setup.

Second Example Embodiment (FIGS. 10, 14, 15, 16)

In the above scenario, for example, as shown in FIG. 19, according to at least some aspects of the invention, there is proposed a device (cMGW) comprising a processor (at least one processor) 191, a memory 192, and an interface (at least one interface) 193, the processor 191 being configured to provide control in a control plane for a terminal (UE) for access to a first access network (5G) and to a second access network (4G), wherein a coverage of the first access network (5G) at least partly overlaps a coverage of the second access network (4G), the terminal is capable of having access to the first access network (5G) and to the second access network (4G) in parallel, and access for the terminal to a respective access network (4G, 5G) is routed in a user plane via a respective distinct access network entity (eNB, 5GAP) and to a respective (compatible) gateway (S-GW, uGW), wherein the processor is further configured to conduct, with the terminal (UE), a connection procedure for access to said second access network (4G), and register said terminal as being capable of having access to the first access network (5G) and to the second access network (4G).

According to individual further aspects, the processor is configured to manage non access stratum context for said first access network (5G) and said second access network (4G), the processor is configured to, responsive to registering said terminal as being capable of having access to the first access network (5G) and to the second access network (4G), initiate the setting of the routing in the user plane via the second access network (4G) such that the user plane is routed via the access network entity (eNB) of the second access network (4G) to the gateway (uGW) of the first access network (5G), the processor is configured to receive, from the access network entity (5GAP) of the first access network (5G), signaling indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G), the processor is configured to detect a need for access of said terminal (UE) to said first access network (5G), instruct the access network entity (eNB) of the second access network (4G) to initiate a connection setup procedure between said terminal and said first access network (5G), receive, from the access network entity (5GAP) of the first access network (5G), signaling indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G), the processor is configured to detect a need for access of said terminal (UE) to said first access network (5G), instruct the access network entity (5GAP) of the first access network (5G) to initiate a paging procedure with said terminal (UE), receive, from the access network entity (5GAP) of the first access network (5G), a paging response indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G).

Figure 21:
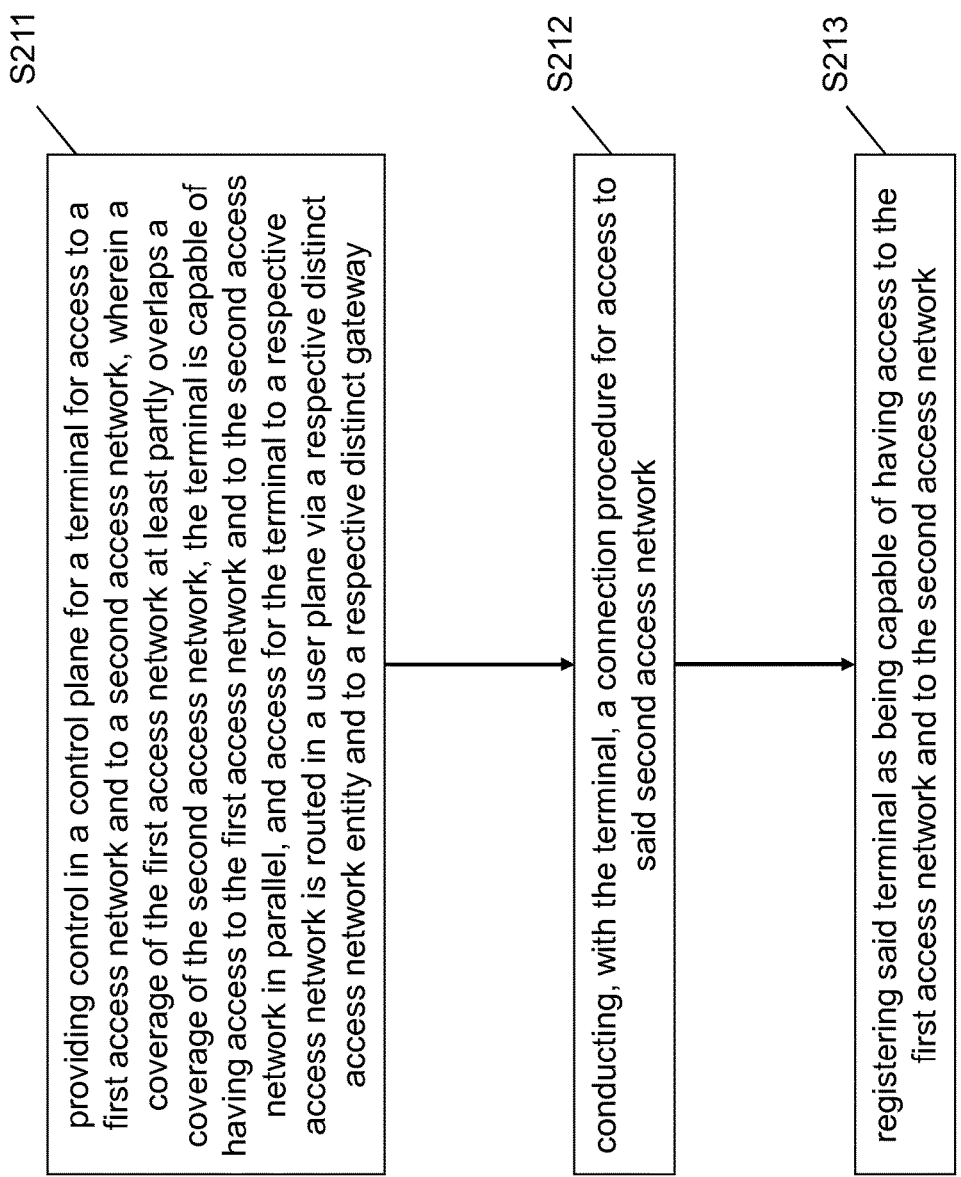
FIG. 21 is a schematic diagram of a procedure according to exemplary embodiments of the present invention.

In addition, as shown in FIG. 21, according to at least some aspects of the invention, there is proposed a method comprising an operation of providing (S211) control in a control plane for a terminal (UE) for access to a first access network (5G) and to a second access network (4G), wherein a coverage of the first access network (5G) at least partly overlaps a coverage of the second access network (4G), the terminal is capable of having access to the first access network (5G) and to the second access network (4G) in parallel, and access for the terminal to a respective access network (4G, 5G) is routed in a user plane via a respective distinct access network entity (eNB, 5GAP) and to a respective (compatible) gateway (S-GW, uGW), an operation of conducting (S212), with the terminal (UE), a connection procedure for access to said second access network (4G), and an operation of registering (S213) said terminal as being capable of having access to the first access network (5G) and to the second access network (4G).

In other words, dual connectivity and combined attach procedure across two RATs (4G and 5G) for IP or Ethernet services is enabled by means of introducing a common core network for two radio access technologies.

FIG. 10 illustrates the high level architecture that assumes common core network for different access technologies but at the same time allows dual connectivity to help improve mobility robustness.

Here, UE supports LTE and 5G, where
  5G and LTE have their own RRC connections (two independent control plane stacks),
  5G and LTE capable UE indicates its preference for 5G services while registering in LTE network, and
  5G and LTE capable UE can perform measurements periodically, based on indication from network or when it detects the need for 5G services, when under coverage area for both LTE and 5G.
In relation to the common core network for LTE and 5G,
  cMGW maintains NAS context for both LTE and 5G,
  cMGW acts as a mobility anchor for both, LTE and 5G,
  user plane for 5G and LTE can go via uGW,
  user plane for LTE can also go via S-GW, P-GW, and
  cMGW/uGW terminates legacy S1-C/U and new S1-C/U* respectively.

Options are illustrated with the help of following scenarios in the overall scenario illustrated in FIG. 8:
1. UE initiated service setup triggering IRAT dual connectivity; and
2. Network initiated service setup triggering IRAT dual connectivity.

For this purpose, following assumptions are made with respect to FIG. 8:
  UE with LTE connection moves to dual coverage zone, i.e., 5G+4G coverage area (from point A to point B); UE detects 5G e.g. because measurements were activated,
    e.g. measurements can be activated by the 5G-UE when entering, and LTE sysinfos indicates 5G neighbors, sysinfo indication could be service specific, as can be the measurement activation,
  UE is registered for LTE with the common core network (cMGW); UE is in EMM-REGISTERED state in LTE and 5G (one EMM state sufficient for both 5G and LTE),
  the state of registration in both domains/RATs may be reflected in new values of the EMM states, such as for instance EMM-REGISTERED-DC,
  UE receives policy information from the network (cMGW) regarding the preferred RAT information for different services,
    this could be a mapping between APN/SFID (Service Flow ID) and preferred RAT; this may indicate that LTE/2G/3G is preferred for voice, 5G/LTE is preferred for internet services, 5G is preferred for V2V services etc.,
    operator policy information can also be pre-configured, or broadcast in sysinfo
  network or UE can trigger setup of dual connectivity when need for a service configured to be served by 5G, this enables establishment of RRC connection in 5G (RRC in LTE is established already).

Figure 14:
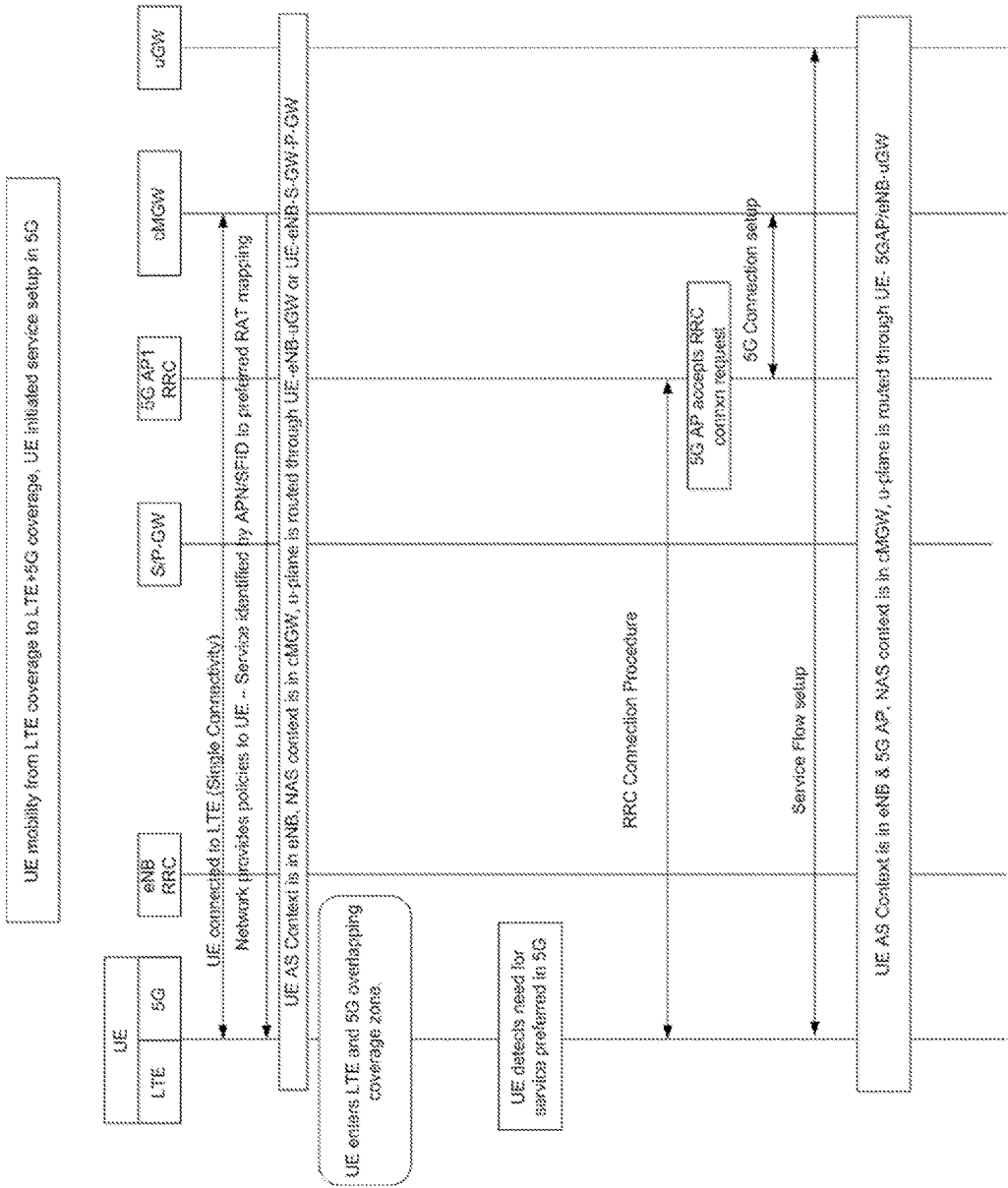
FIG. 14 shows a schematic diagram of signaling sequences according to exemplary embodiments of the present invention.

1. UE initiated service setup triggering IRAT dual connectivity (FIG. 14):
Here, as shown in FIG. 14, a UE initiated service setup triggers IRAT dual connectivity:
  UE is in the 5G coverage area,
  UE may detect that V2V services are offered by the network in the area or the user may initiate a new application that requires setup of V2V services,
  when UE determines that V2V services are needed, it knows that 5G is preferred for V2V and it also knows that it is already in the area where 5G coverage is available (i.e. based on measurement report), and
  UE initiates requests for service setup which triggers setup of RRC connection in 5G.

Figure 15:
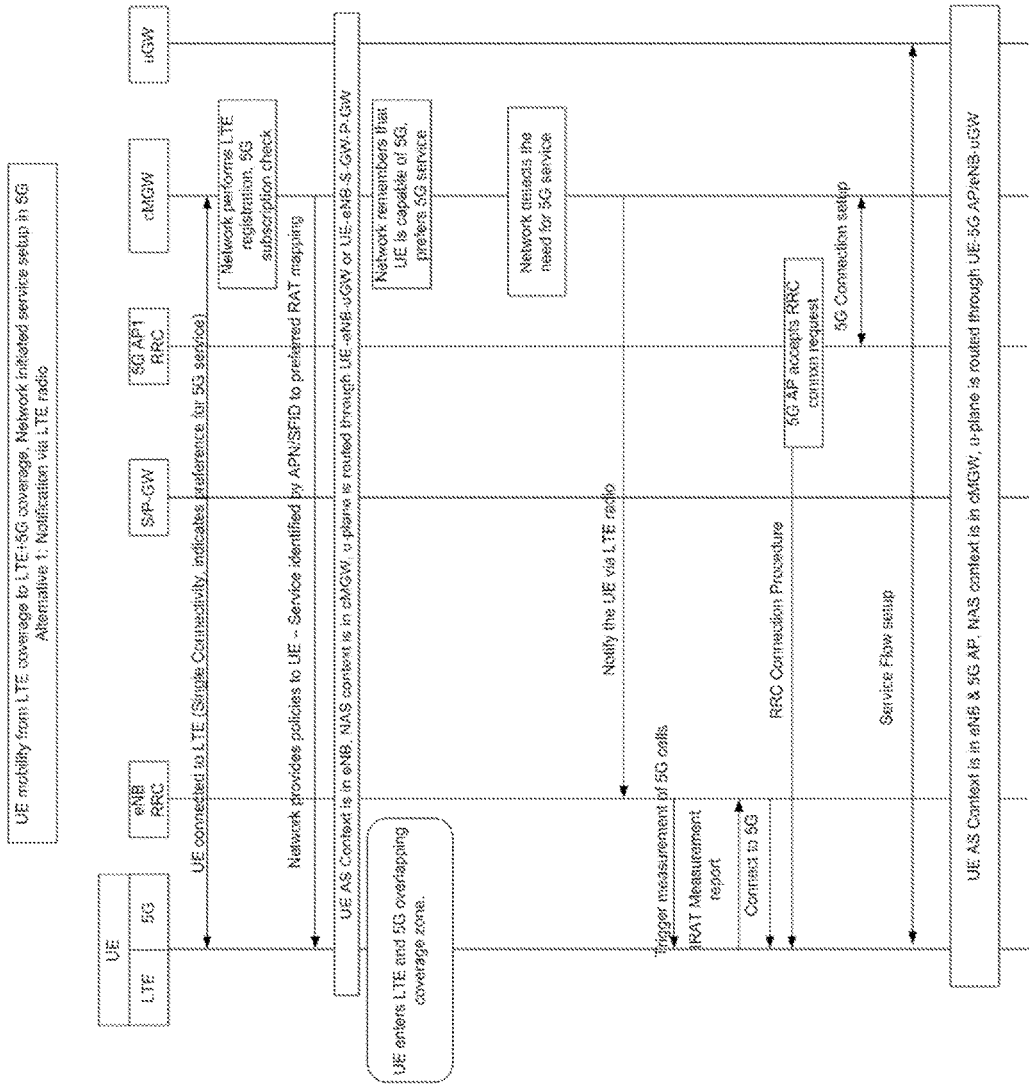
FIG. 15 shows a schematic diagram of signaling sequences according to exemplary embodiments of the present invention.
Figure 16:
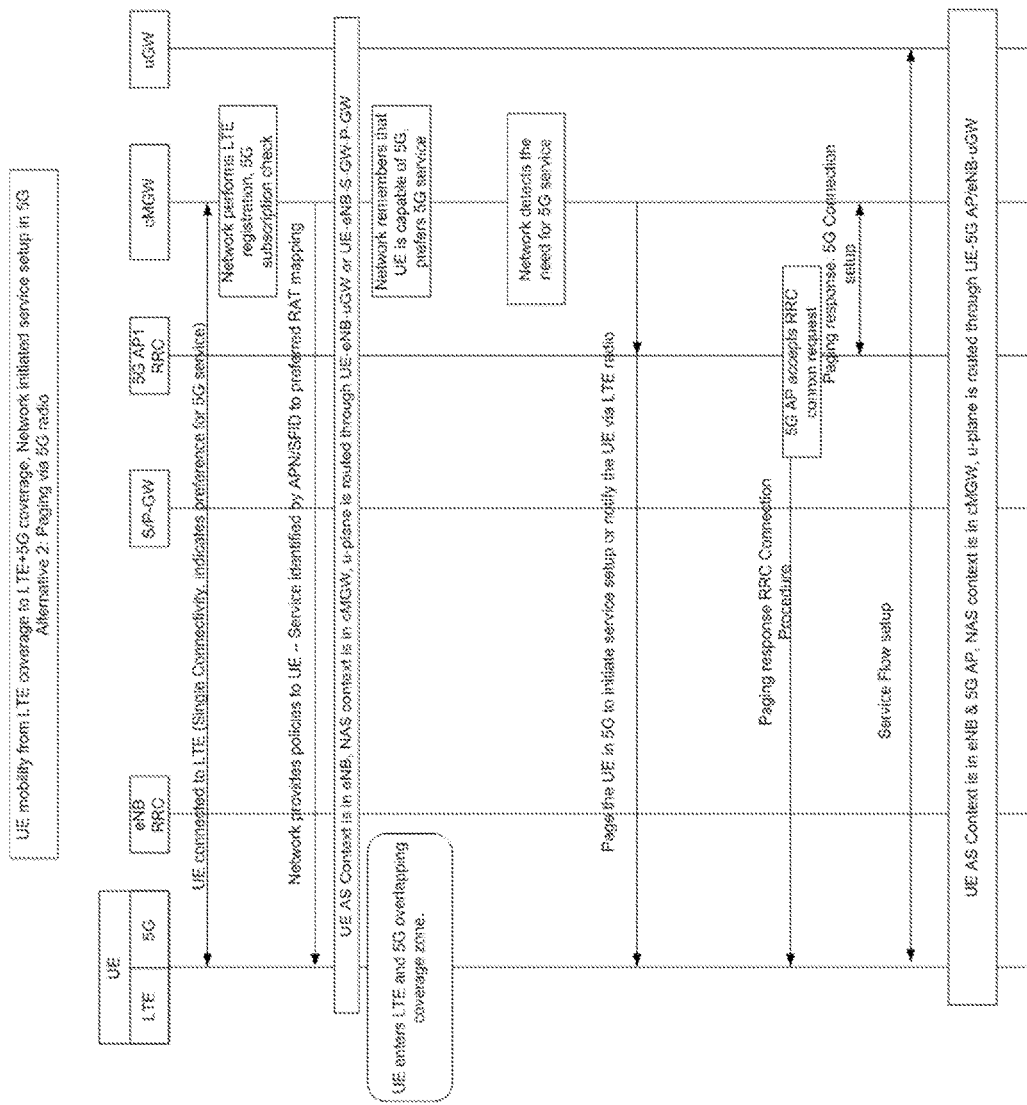
FIG. 16 shows a schematic diagram of signaling sequences according to exemplary embodiments of the present invention.

2. Network initiated service setup triggering IRAT dual connectivity (FIGS. 15 and 16):
Here, as shown in FIGS. 15 and 16, network initiated service setup triggers IRAT dual connectivity:
  network remembers that the UE is interested in 5G services; when network detects the need for a new service (mobile terminated) that can be served in 5G optimally, network can trigger the UE to establish services in 5G using one of the following 2 methods:
    1. network notifies (FIG. 15) the UE via E-UTRAN radio network (assumption: eNB is upgraded), and
    2. network pages (FIG. 16) the UE via 5G radio (assumption: UE is connected in E-UTRAN but listens to paging channel also in 5G),
  in case of (1), eNB triggers the UE to perform 5G measurement and based on measurement report, eNB can determine whether it is in the 5G coverage area or not; if the UE is in 5G coverage area, eNB can request the UE to establish RRC connection in 5G in order to setup a new service,
  in case of (2), UE is expected to respond to paging via 5G radio (i.e. establish RRC connection) towards the network; network can then initiate establishment of new service in the 5G radio network.

Option (1) is more optimal compared to option (2) as option (2) requires that UE needs to listen to paging in 5G radio while connected in LTE.

Measures according to the second example embodiment do have the following benefits:
  common core for different radio access—moving towards "core independent of access" concept,
  interworking can be enabled with some but not radical changes to legacy nodes (only eNB impacted),
  when dual RRC connection is established, chances of complete radio link failure is low, and
  robustness of network connectivity, since UE is connected to LTE macro even when there is handover for 5G radio due to mobility.

According to exemplary aspects of the second example embodiment of the invention, following modifications are proposed:
  Combined registration with both 4G and 5G in connected mode,
  one authentication procedure for both RATs,
  one CN node serving a UE with two RATs in parallel— Multi RAT dual connectivity,
  common NAS context, rendering individual CN relocation procedures obsolete (e.g. no relocation needed from cMGW to MME in order to support PS registration in both RATs); this also eliminates the need for an additional interface between CN nodes,
  common security context for two RATs, isolating the need for dual security procedures, and
  evolved mobility robustness—making "make before break" always possible.

Figure 17:
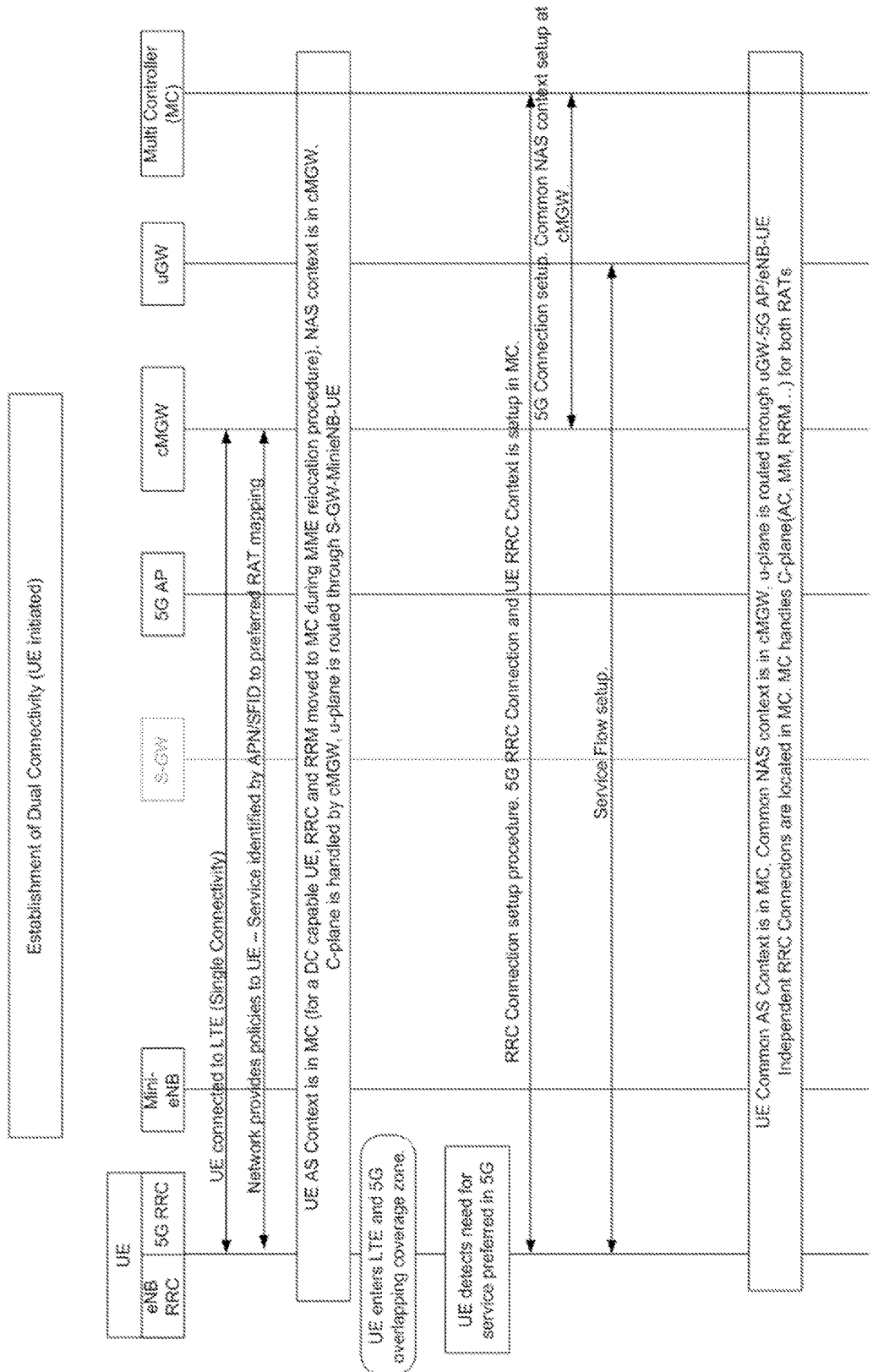
FIG. 17 shows a schematic diagram of signaling sequences according to exemplary embodiments of the present invention.
Figure 18:
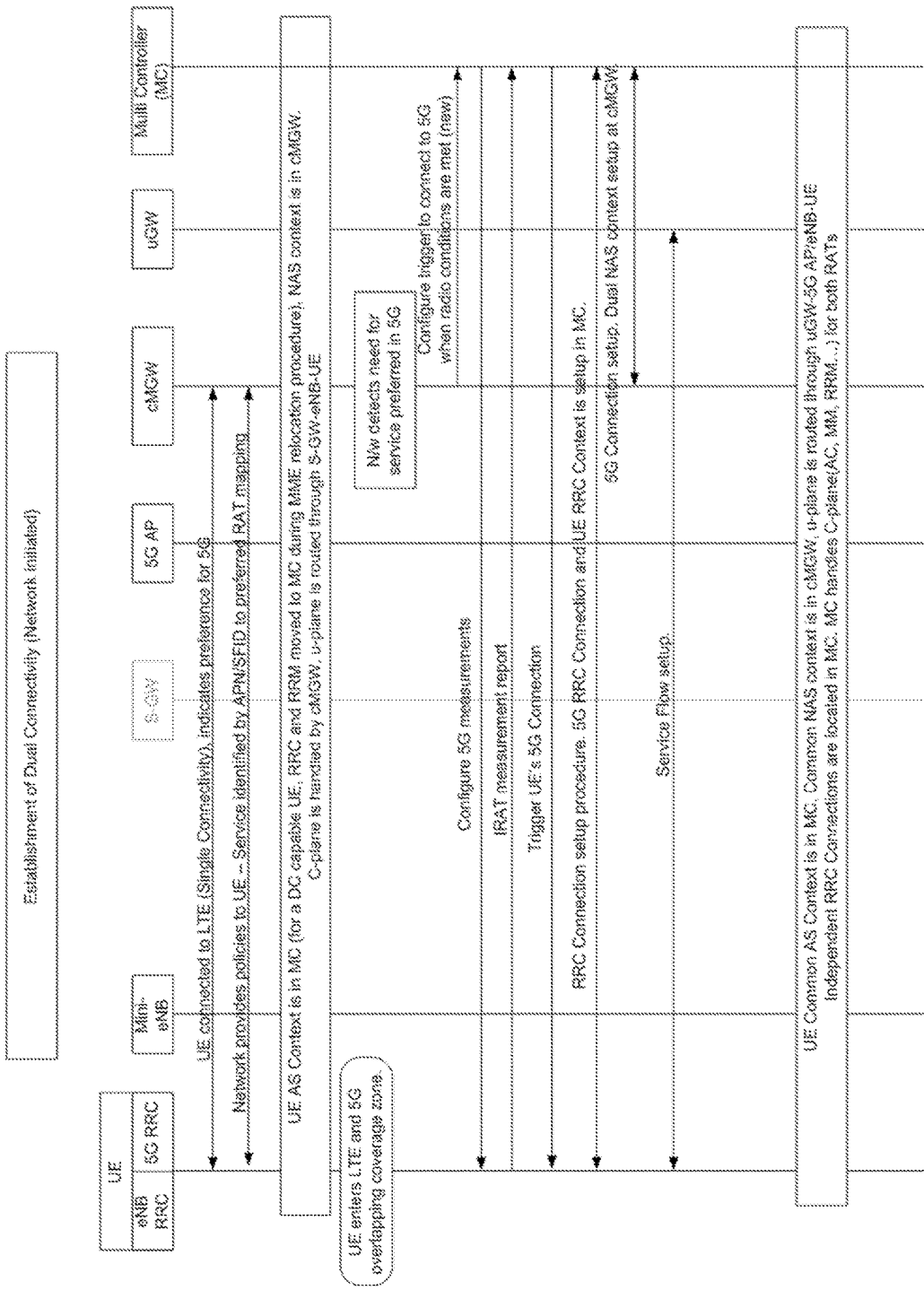
FIG. 18 shows a schematic diagram of signaling sequences according to exemplary embodiments of the present invention.

Third Example Embodiment (FIGS. 11, 17, 18)

In the above scenario, for example, as shown in FIG. 19, according to at least some aspects of the invention, there is proposed a device (cMGW) comprising a processor (at least one processor) 191, a memory 192, and an interface (at least one interface) 193, the processor 191 being configured to provide control in a control plane for a terminal (UE) for access to a first access network (5G) and to a second access network (4G), wherein a coverage of the first access network (5G) at least partly overlaps a coverage of the second access network (4G), the terminal is capable of having access to the first access network (5G) and to the second access network (4G) in parallel, access for the terminal to a respective access network (4G, 5G) is routed in a user plane via a respective distinct access network entity (eNB, 5GAP) and to a respective (compatible) gateway (S-GW, uGW), and said control in said control plane is provided via a network controller entity (MC) adopting connection management for said access network entity (eNB) of the second access network (4G), wherein the processor is further configured to conduct, with the terminal (UE), a connection procedure for access to said second access network (4G), and register said terminal as being capable of having access to the first access network (5G) and to the second access network (4G).

According to individual further aspects, the processor is configured to manage non access stratum context for said first access network (5G) and said second access network (4G), the processor is configured to maintain said non access stratum context for said first access network (5G) and to maintain said non access stratum context for said second access network (4G), the processor is configured to, responsive to registering said terminal as being capable of having access to the first access network (5G) and to the second access network (4G), initiate the setting of the routing in the user plane via the second access network (4G) such that the user plane is routed via the access network entity (eNB) of the second access network (4G) to the gateway (uGW) of the first access network (5G), the processor is configured to receive, from the network controller entity (MC), signaling indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G), the processor is configured to detect a need for access of said terminal (UE) to said first access network (5G), instruct the network controller entity (MC) to initiate a connection setup procedure between said terminal and said first access network (5G), receive, from the network controller entity (MC), signaling indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G), the processor is configured to detect a need for access of said terminal (UE) to said first access network (5G), instruct the network controller entity (MC) to cause initiation of a paging procedure with said terminal (UE), receive, from the network controller entity (Multi-controller), a paging response indicative of a requested access of said terminal (UE) to said first access network (5G), set up a connection for said requested access, and initiate the setting of the routing in the user plane via the first access network (5G) such that the user plane is routed via the access network entity (5GAP) of the first access network (5G) to the gateway (uGW) of the first access network (5G).

Figure 22:
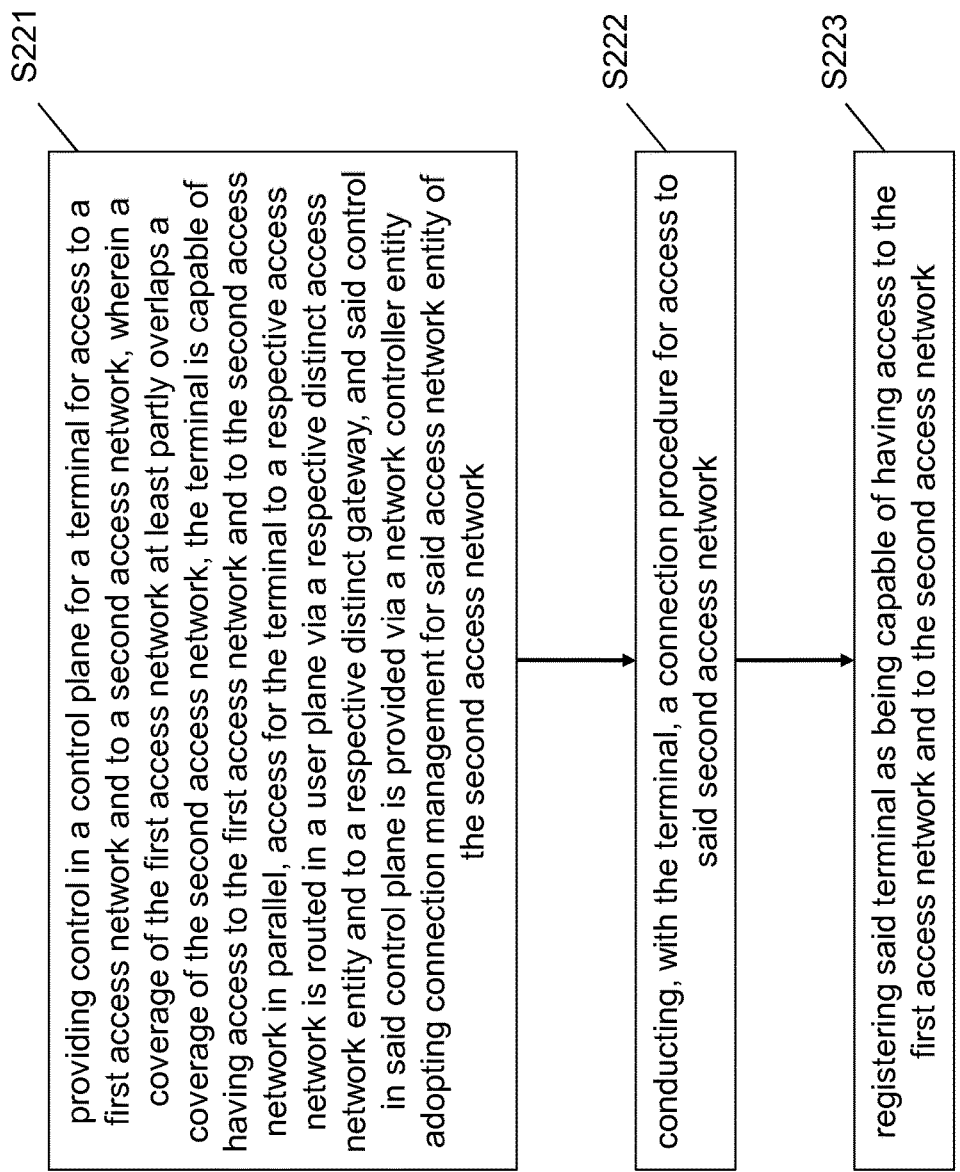
FIG. 22 is a schematic diagram of a procedure according to exemplary embodiments of the present invention.

In addition, as shown in FIG. 22, according to at least some aspects of the invention, there is proposed a method comprising an operation of providing (S221) control in a control plane for a terminal (UE) for access to a first access network (5G) and to a second access network (4G), wherein a coverage of the first access network (5G) at least partly overlaps a coverage of the second access network (4G), the terminal is capable of having access to the first access network (5G) and to the second access network (4G) in parallel, access for the terminal to a respective access network (4G, 5G) is routed in a user plane via a respective distinct access network entity (eNB, 5GAP) and to a respective (compatible) gateway (S-GW, uGW), and said control in said control plane is provided via a network controller entity (MC) adopting connection management for said access network entity (eNB) of the second access network (4G), an operation of conducting (S222), with the terminal (UE), a connection procedure for access to said second access network (4G), and an operation of registering (S223) said terminal as being capable of having access to the first access network (5G) and to the second access network (4G).

In the above scenario, for example, as shown in FIG. 19, according to at least some further aspects of the invention, there is proposed a device (MC) comprising a processor (at least one processor) 191, a memory 192, and an interface (at least one interface) 193, the processor 191 being configured to provide, in a control plane for a terminal (UE) capable of having access to a first access network (5G) and to a second access network (4G) in parallel, connection management for an access network entity (eNB) of said second access network (4G), wherein a coverage of the first access network (5G) at least partly overlaps a coverage of the second access network (4G), access for the terminal to a respective access network (4G, 5G) is routed in a user plane via a respective distinct access network entity (eNB, 5GAP) and to a respective (compatible) gateway (S-GW, uGW), and control in said control plane for said terminal (UE) for access to said first access network (5G) and to said second access network (4G) is provided by a packet core network entity (cMGW), wherein the processor is further configured to receive, in the control plane, messages related to a connection procedure with said terminal (UE) for access to said second access network (4G), and forward, in the control plane, said messages related to said connection procedure with said terminal (UE) for access to said second access network (4G).

According to individual further aspects, the processor is configured to manage a common access stratum context for said first access network (5G) and said second access network (4G), which could be effectively used to minimize service disruption during handover among the small cells of the first access network (5G), the processor is configured to maintain said access stratum context for said first access network (5G) and to maintain said access stratum context for said second access network (4G), the processor is configured to receive, from the terminal, signaling indicative of a requested access of said terminal (UE) to said first access network (5G), and transmit, to said packet core network entity (cMGW), signaling indicative of said requested access of said terminal (UE) to said first access network (5G), the processor is configured to receive an instruction to initiate a connection setup procedure between said terminal and said first access network (5G), initiate said connection setup procedure, and transmit, to said packet core network entity (cMGW), signaling indicative of said requested access of said terminal (UE) to said first access network (5G), the processor is configured to receive an instruction to cause initiation of a paging procedure with said terminal (UE), instruct the access network entity (5GAP) of the first access network (5G) to initiate said paging procedure with said terminal (UE), receive, from the access network entity (5GAP) of the first access network (5G), a paging response indicative of a requested access of said terminal (UE) to said first access network (5G), and transmit, to said packet core network entity (cMGW), signaling indicative of said requested access of said terminal (UE) to said first access network (5G).

Figure 23:
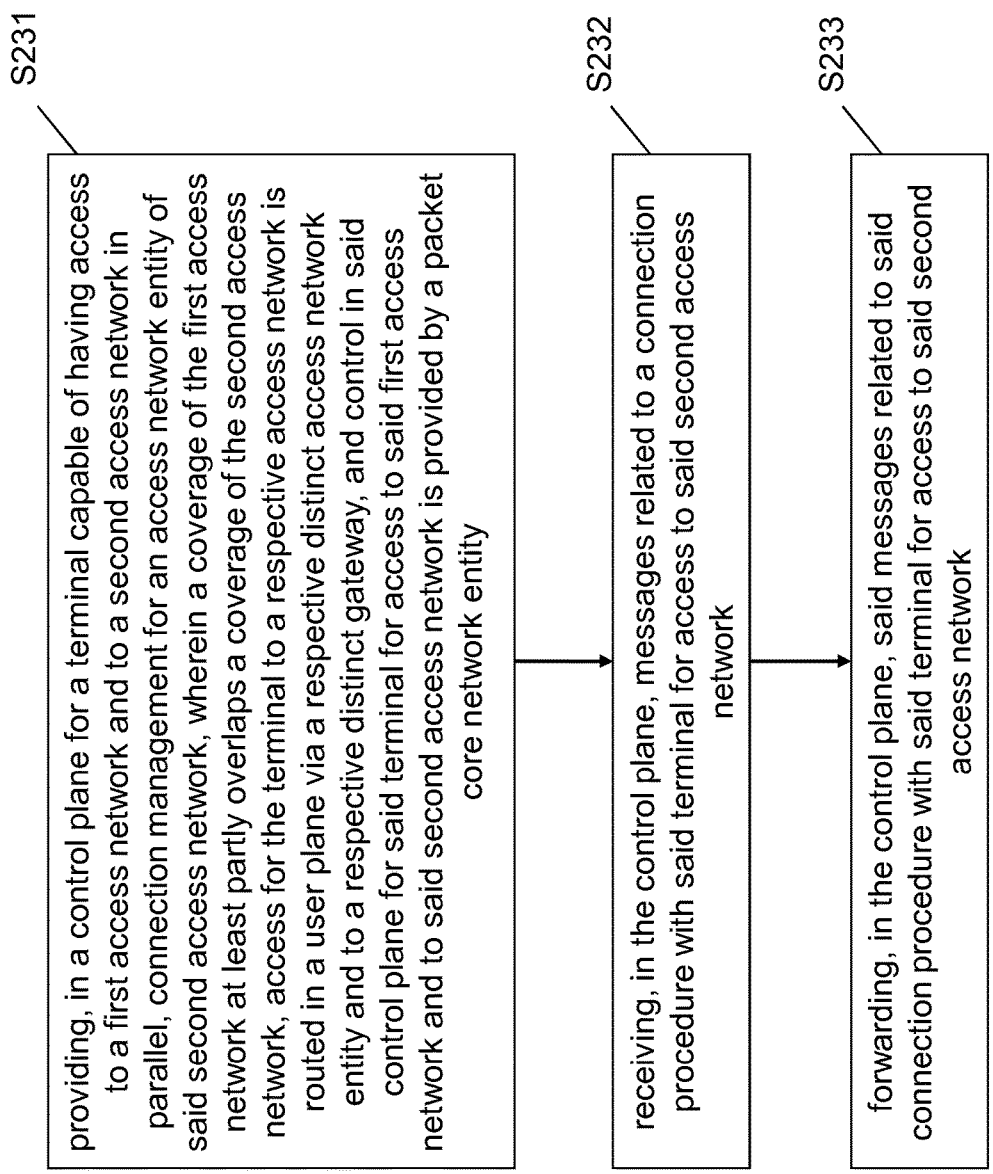
FIG. 23 is a schematic diagram of a procedure according to exemplary embodiments of the present invention.

In addition, as shown in FIG. 23, according to at least some aspects of the invention, there is proposed a method comprising an operation of providing (S231), in a control plane for a terminal (UE) capable of having access to a first access network (5G) and to a second access network (4G) in parallel, connection management for an access network entity (eNB) of said second access network (4G), wherein a coverage of the first access network (5G) at least partly overlaps a coverage of the second access network (4G), access for the terminal to a respective access network (4G, 5G) is routed in a user plane via a respective distinct access network entity (eNB, 5GAP) and to a respective (compatible) gateway (S-GW, uGW), and control in said control plane for said terminal (UE) for access to said first access network (5G) and to said second access network (4G) is provided by a packet core network entity (cMGW), an operation of receiving (S232), in the control plane, messages related to a connection procedure with said terminal (UE) for access to said second access network (4G), and an operation of forwarding (S233), in the control plane, said messages related to said connection procedure with said terminal (UE) for access to said second access network (4G).

In other words, dual connectivity and combined attach procedure across two RATs (4G and 5G) for IP or Ethernet services is enabled by means of introducing a multi-controller (MC) to maintain two RRC connections and a single AS context for two different radio access technologies and a common core to maintain a single NAS context for both 4G and 5G.

FIG. 11 illustrates the high level architecture that assumes common core network, introduces multi-controller for handling AS of different access technologies but at the same time allows dual connectivity to help improve mobility robustness.

Here, UE supports LTE and 5G, where
  5G and LTE have their own RRC connections (two independent control plane stacks),
  5G and LTE capable UE indicates its preference for 5G services while registering in LTE network, and
  5G and LTE capable UE can perform measurements periodically, based on indication from network or when it detects the need for 5G services.

Further, a Mini-eNB as illustrated in FIG. 11 is an eNB without RRC functions. It has to be noted here that a Mini-eNB, which is a reduced form of the existing eNB, shall perform as it is for LTE-only capable users.

In relation to the Dual connectivity for LTE and 5G,
  cMGW maintains NAS signaling connections, NAS context for both LTE and 5G,
  common AS context in Multi-Controller (MC),
  Multi-Controller (MC) maintains RRC connections, AS context for both LTE and 5G,
  user plane for 5G and LTE can go via uGW,
  user plane for LTE can also go via S-GW, P-GW, and
  cMGW/uGW terminates legacy S1-C/U and new S1-C/U* respectively.

Options are illustrated with the help of following scenarios in the overall scenario illustrated in FIG. 8:
  1. UE initiated service setup triggering IRAT dual connectivity; and
  2. Network initiated service setup triggering IRAT dual connectivity.

For this purpose, following assumptions are made with respect to FIG. 8:
  UE with LTE connection moves to dual coverage zone, i.e., 5G+4G coverage area (from point A to point B);
  UE detects 5G e.g. because measurements were activated,
    e.g. measurements can be activated by the 5G-UE when entering, and LTE sysinfos indicates 5G neighbors,
    sysinfo indication could be service specific, as can be the measurement activation,
  UE is registered for LTE with the common core network (cMGW); UE is in EMM-REGISTERED state in LTE and 5G (one EMM state sufficient for both 5G and LTE),
  UE receives policy information from the network (cMGW) regarding the preferred RAT information for different services,
    this could be a mapping between APN/SFID (Service Flow ID) and preferred RAT; this may indicate that LTE/2G/3G is preferred for voice, 5G/LTE is preferred for internet services, 5G is preferred for V2V services etc.,
    operator policy information can also be pre-configured, or broadcast in sysinfo,
  network or UE can trigger setup of dual connectivity when need for a service configured to be served by 5G, this enables establishment of RRC connection in 5G (RRC in LTE is established already), and
  the termination of the LTE RRC connection in the multi-controller implies that the eNB does not terminate it and that the eNB for this UE therefore has reduced responsibilities; this is highlighted by the term "mini-eNB" in the corresponding Figures; the eNB may act as full eNB to some UEs and as mini-eNB to others.

1. UE initiated service setup triggering IRAT dual connectivity (FIG. 17):
Here, as shown in FIG. 17, a UE initiated service setup triggers IRAT dual connectivity:
  UE is in the 5G coverage area,
  it may detect that V2V services are offered by the network in the area or the user may initiate a new application that requires setup of V2V services,
  when UE determines that V2V services are needed, it knows that 5G is preferred for V2V and it also knows that it is already in the area where 5G coverage is available (i.e. based on measurement report), and
  UE initiates requests for service setup which triggers setup of RRC connection in 5G.

2. Network initiated service setup triggering IRAT dual connectivity (FIG. 18):
Here, as shown in FIG. 18, a network initiated service setup triggers IRAT dual connectivity:
  network remembers that the UE is interested in 5G services; when network detects the need for a new service (mobile terminated) that can be served in 5G optimally, network can trigger the UE to establish services in 5G using one of the following 2 methods:

1. network notifies (FIG. 18) the UE via E-UTRAN radio network, and
2. network pages the UE via 5G radio (assumption: UE is connected in E-UTRAN but listens to paging channel also in 5G), in case of (1), MC triggers the UE to perform 5G measurement and based on measurement report, MC can determine whether it is in the 5G coverage area or not; if the UE is in 5G coverage area, MC can request the UE to establish RRC connection in 5G in order to setup a new service, in case of (2), UE is expected to respond to paging via 5G radio (i.e. establish RRC connection) towards the network; network can then initiate establishment of new service in the 5G radio network.

Option (1) is more optimal compared to option (2) as option (2) requires that UE needs to listen to paging in 5G radio while connected in LTE.

Measures according to the third example embodiment do have the following benefits:
common core for different radio access—moving towards "core independent of access" concept,
mobility handling is simplified when there is coverage loss; reduced context transfer (no need for X2 context transfer), latency during handover; since it is the Multi-Controller controlling both radio, network can detect radio loss faster,
faster intra-5G mobility for a UE under dual connectivity due to the RRC connection setup and context transfer being obsolete,
when dual RRC connection is established, chances of complete radio link failure is low,
robustness of network connectivity, since UE is connected to LTE macro even when there is handover for 5G radio due to mobility, and
multi-controller (MC) can serve as an aggregation point for several 5G APs and LTE RRC connections.

According to exemplary aspects of the third example embodiment of the invention, following modifications are proposed:
combined registration with both 4G and 5G in connected mode,
one authentication procedure for both RATs,
one CN node serving a UE with two RATs in parallel—Multi RAT dual connectivity,
common NAS context, rendering individual CN relocation procedures obsolete; this also eliminates the need for an additional interface between CN nodes,
common security context for two RATs, isolating the need for dual security procedures,
common AS context, eliminating the need for context transfer during intra-RAT handovers there by reducing service interruption, and
evolved control plane and user plane mobility robustness—making "make before break" always possible; and minimization of service break during HOs.

It has to be noted that also, the method, devices and computer program products presented herein are generally applicable to any type of inter RAT which shall benefit from seamless services. A variety of other systems can benefit also from the principles presented herein as long as they have identical or similar properties. The principles are not restricted to be applied to radio networks but other (wireless) media may also be possible as at least one of the first and second access networks between which a terminal may experience mobility.

Herein above, a focus was laid on describing aspects of the invention in relation to a device (such as a cMGW, MC).

It is to be understood that such principles are likewise applicable to and that the aspects of the invention can be realized by a corresponding method.

Embodiments of the present invention may be implemented in software, hardware, application logic or a combination of software, hardware and application logic.

The software, application logic and/or hardware generally resides on a network entity such as a cMGW, MC or similar functional entity.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present invention relates in particular but without limitation to mobile communications, for example to environments under WCDMA, LTE/4G, 5G, WIMAX and WLAN and can advantageously be implemented in user equipments or smart phones, or personal computers connectable to such networks. That is, it can be implemented as/in chipsets to connected devices, and/or modems thereof.

While scenarios were distinguished between network initiated or terminal initiated, it is to be understood that both scenarios can coexist for use and that depending on specific conditions a selection there between can be made and/or preference can be given by configuration to either a user initiated or network initiated procedure.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

There are provided measures for improvements in dual connectivity for different access networks. Such measures exemplarily comprise providing control in a control plane for a terminal (UE) for access to a first access network (5G), wherein a coverage of the first access network (5G) at least partly overlaps a coverage of a second access network (4G), the terminal is capable of having access to the first access network (5G) and to the second access network (4G) in parallel, and access for the terminal to a respective access network (4G, 5G) is routed in a user plane via a respective distinct access network entity (eNB, 5GAP) and to a respective (compatible) gateway (S-GW, uGW); receiving, via an interface (G1), from a packet core network entity (MME) providing control in said control plane for said terminal (UE) for access to said second access network (4G), a message indicative of said terminal (UE) to be registered; and registering said terminal as being capable of having access to the first access network (5G).

List of Acronyms and Abbreviations

3GPP Third Generation Partnership Project
APN Access Point Name
AS Access Stratum
cMGW control plane Mobile Gateway
CN core network
c-plane control plane
CS circuit switched
DC Dual Connectivity
EPS Evolved Packet System
GERAN GSM/EDGE Radio Access Network
GPRS General Packet Radio Service
GW gateway
HO Handover
IMSI International Mobile Subscriber Identity
IP internet protocol
IRAT inter-RAT
ISR Idle mode Signaling Reduction
MC Multi-Controller
MeNB Master eNB
MME Mobility Management Entity
MNO Mobile Network Operator
NAS Non-Access Stratum
PDCP Packet Data Convergence Protocol
PDN Packet Data Network
RAN Radio Access Network
RAT Radio Access Technology
RLC Radio Link Control
RRC Radio Resource Control
SeNB Secondary eNB
SFID Service Flow ID
S-GW serving GW
uGW user plane Gateway
u-plane user plane
UTRAN Universal Terrestrial Radio Access Network
V2V Vehicle-to-Vehicle
V2X Vehicle-to-X

The invention claimed is:

1. A device, comprising:
a processor configured to provide control in a control plane for a terminal for access to a first access network, wherein
a coverage of the first access network at least partly overlaps a coverage of a second access network, the first access network being of a first radio access technology and the second access network being of a second, different, radio access technology,
the terminal is capable of having access to the first access network and to the second access network in parallel, and
access for the terminal to a respective access network is routed in a user plane via a respective distinct access network entity and to a respective compatible gateway, wherein
the processor is configured to
receive, via an interface, from a packet core network entity providing control in said control plane for said terminal for access to said second access network, a message indicative of said terminal to be registered to the first access network, and
register said terminal as having access to the first access network.

2. The device according to claim 1, wherein
the processor is configured to
manage non access stratum context for said first access network with non access stratum context for said second access network being managed by said packet core network entity.

3. The device according to claim 1, wherein
the processor is configured to,
responsive to registering said terminal as being capable of having access to the first access network,
initiate the modification of the routing in the user plane via the second access network such that
the user plane is routed via the access network entity of the second access network to the gateway of the first access network.

4. The device according to claim 1, wherein
the processor is configured to
receive, from the access network entity of the first access network, signaling indicative of a requested access of said terminal to said first access network,
set up a connection for said requested access, and
initiate the setting of the routing in the user plane via the first access network such that
the user plane is routed via the access network entity of the first access network to the gateway of the first access network.

5. The device according to claim 1, wherein
the processor is configured to
detect a need for access of said terminal to said first access network,
instruct the packet core network entity of said second access network to cause initiation of a connection setup procedure between said terminal and said first access network,
receive, from the access network entity of the first access network, signaling indicative of a requested access of said terminal to said first access network,
set up a connection for said requested access, and
initiate the setting of the routing in the user plane via the first access network such that
the user plane is routed via the access network entity of the first access network to the gateway of the first access network.

6. The device according to claim 1, wherein
the processor is configured to
detect a need for access of said terminal to said first access network,
instruct the access network entity of the first access network to initiate a paging procedure with said terminal,
receive, from the access network entity of the first access network, a paging response indicative of a requested access of said terminal to said first access network,
set up a connection for said requested access, and
initiate the setting of the routing in the user plane via the first access network such that
the user plane is routed via the access network entity of the first access network to the gateway of the first access network.

7. A method, comprising:
providing control in a control plane for a terminal for access to a first access network, wherein
a coverage of the first access network at least partly overlaps a coverage of a second access network, the first access network being of a first radio access technology and the second access network being of a second, different, radio access technology, the terminal is capable of having access to the first access network and to the second access network in parallel, and access for the terminal to a respective access network is routed in a user plane via a respective distinct access network entity and to a respective compatible gateway, the method further comprising:

receiving, via an interface, from a packet core network entity providing control in said control plane for said terminal for access to said second access network, a message indicative of said terminal to be registered to the first access network, and registering said terminal as having access to the first access network.

8. The method according to claim 7, further comprising:
managing non access stratum context for said first access network with non access stratum context for said second access network being managed by said packet core network entity.

9. The method according to claim 7, further comprising:
responsive to registering said terminal as being capable of having access to the first access network,
initiating the modification of the routing in the user plane via the second access network such that
the user plane is routed via the access network entity of the second access network to the gateway of the first access network.

10. The method according to claim 7, further comprising:
receiving, from the access network entity of the first access network, signaling indicative of a requested access of said terminal to said first access network,
setting up a connection for said requested access, and
initiating the setting of the routing in the user plane via the first access network such that
the user plane is routed via the access network entity of the first access network to the gateway of the first access network.

11. The method according to claim 7, further comprising:
detecting a need for access of said terminal to said first access network,
instructing the packet core network entity of said second access network to cause initiation of a connection setup procedure between said terminal and said first access network,
receiving, from the access network entity of the first access network, signaling indicative of a requested access of said terminal to said first access network,
setting up a connection for said requested access, and
initiating the setting of the routing in the user plane via the first access network such that
the user plane is routed via the access network entity of the first access network to the gateway of the first access network.

12. The method according to claim 7, further comprising:
detecting a need for access of said terminal to said first access network,
instructing the access network entity of the first access network to initiate a paging procedure with said terminal,
receiving, from the access network entity of the first access network, a paging response indicative of a requested access of said terminal to said first access network,
setting up a connection for said requested access, and
initiating the setting of the routing in the user plane via the first access network such that
the user plane is routed via the access network entity of the first access network to the gateway of the first access network.

13. A computer program product embodied on a non-transitory computer-readable medium, said product comprising computer-executable computer program code which, when the program is run on a computer, is configured to cause the computer to carry out the method according to claim 7.

* * * * *